(12) United States Patent
Woodruff et al.

(10) Patent No.: US 12,384,107 B2
(45) Date of Patent: Aug. 12, 2025

(54) THREE-DIMENSIONAL PRINTING

(71) Applicant: PERIDOT PRINT LLC, Palo Alto, CA (US)

(72) Inventors: Shannon Reuben Woodruff, San Diego, CA (US); Emre Hiro Discekici, San Diego, CA (US); Rachael Donovan, San Diego, CA (US); Carolin Fleischmann, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 322 days.

(21) Appl. No.: 17/417,080

(22) PCT Filed: Jul. 15, 2019

(86) PCT No.: PCT/US2019/041849
§ 371 (c)(1),
(2) Date: Jun. 21, 2021

(87) PCT Pub. No.: WO2021/010972
PCT Pub. Date: Jan. 21, 2021

(65) Prior Publication Data
US 2022/0134648 A1    May 5, 2022

(51) Int. Cl.
B29C 64/165     (2017.01)
B33Y 10/00      (2015.01)
(Continued)

(52) U.S. Cl.
CPC ............ *B29C 64/165* (2017.08); *B33Y 10/00* (2014.12); *B33Y 30/00* (2014.12); *B29K 2077/00* (2013.01); *B29K 2105/0044* (2013.01)

(58) Field of Classification Search
CPC ........ B29C 64/165; B33Y 10/00; B33Y 30/00
See application file for complete search history.

(56) References Cited

U.S. PATENT DOCUMENTS

| 3,904,705 A | 9/1975 | White |
| 2006/0122295 A1 | 6/2006 | Oysaed et al. |

(Continued)

FOREIGN PATENT DOCUMENTS

| CN | 101492551 | 7/2009 |
| CN | 103351617 | 10/2013 |

(Continued)

OTHER PUBLICATIONS

MCC Menssing Chemiehandel, "Antioxidant 168", <https://mcc-hamburg.de/en/produkt/antioxidant-168>, Retrieved on Jun. 16, 2025, 5 pages.

*Primary Examiner* — Edmund H Lee
(74) *Attorney, Agent, or Firm* — Dierker & Kavanaugh, P.C.

(57) ABSTRACT

An example of a kit for 3D printing includes a build material composition and a fusing agent to be applied to at least a portion of the build material composition during 3D printing. The build material composition of the kit includes a polyamide 6,13 material, a phosphorus-containing antioxidant, and a sulfur-containing antioxidant, or a polyamide 6 material, the sulfur-containing antioxidant, and a phenolic antioxidant. The fusing agent includes a radiation absorber to absorb radiation to melt or fuse the build material composition in the at least the portion.

17 Claims, 8 Drawing Sheets

(51) Int. Cl.
B33Y 30/00 (2015.01)
B29K 77/00 (2006.01)
B29K 105/00 (2006.01)

(56) References Cited

U.S. PATENT DOCUMENTS

| | | | |
|---|---|---|---|
| 2013/0316145 | A1 | 11/2013 | Diekmann et al. |
| 2014/0194570 | A1 | 7/2014 | Kato et al. |
| 2016/0280970 | A1 | 9/2016 | Tan et al. |
| 2019/0054690 | A1 | 2/2019 | Feng et al. |

FOREIGN PATENT DOCUMENTS

| | | | | |
|---|---|---|---|---|
| CN | 104140669 | | * | 1/2014 |
| CN | 105238041 | A | | 1/2016 |
| CN | 107722614 | A | | 2/2018 |
| CN | 108047493 | A | | 5/2018 |
| CN | 108997745 | A | | 12/2018 |
| DE | 2360172 | A1 | | 6/1975 |
| DE | 102017215780 | A1 | | 3/2019 |
| EP | 1028142 | A2 | | 8/2000 |
| EP | 10333222 | | * | 9/2000 |
| EP | 2662199 | | * | 11/2013 |
| JP | 2004535504 | | * | 11/2004 |
| KR | 2016146063 | | * | 12/2016 |
| WO | 2008/057844 | A1 | | 5/2008 |
| WO | WO-2008085311 | A1 | | 7/2008 |
| WO | WO-2011014211 | | | 2/2011 |
| WO | WO-2011102861 | | | 8/2011 |
| WO | WO-2017014785 | A1 | | 1/2017 |
| WO | WO2017/018525 | | * | 2/2017 |
| WO | WO2017140764 | | * | 8/2017 |
| WO | WO-2017196358 | A1 | | 11/2017 |
| WO | WO-2017196364 | A1 | | 11/2017 |
| WO | WO-2018017079 | A1 | | 1/2018 |
| WO | WO-2018049365 | A1 | | 3/2018 |
| WO | 2019/048313 | A1 | | 3/2019 |
| WO | 2019/108200 | A1 | | 6/2019 |
| WO | 2019/108273 | A1 | | 6/2019 |
| WO | 2019/108288 | A1 | | 6/2019 |
| WO | WO2019108200 | | * | 6/2019 |

* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial curing, thermal merging/fusing, melting, sintering, etc. of the build material, and the mechanism for material coalescence may depend upon the type of build material used. For some materials, at least partial melting may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
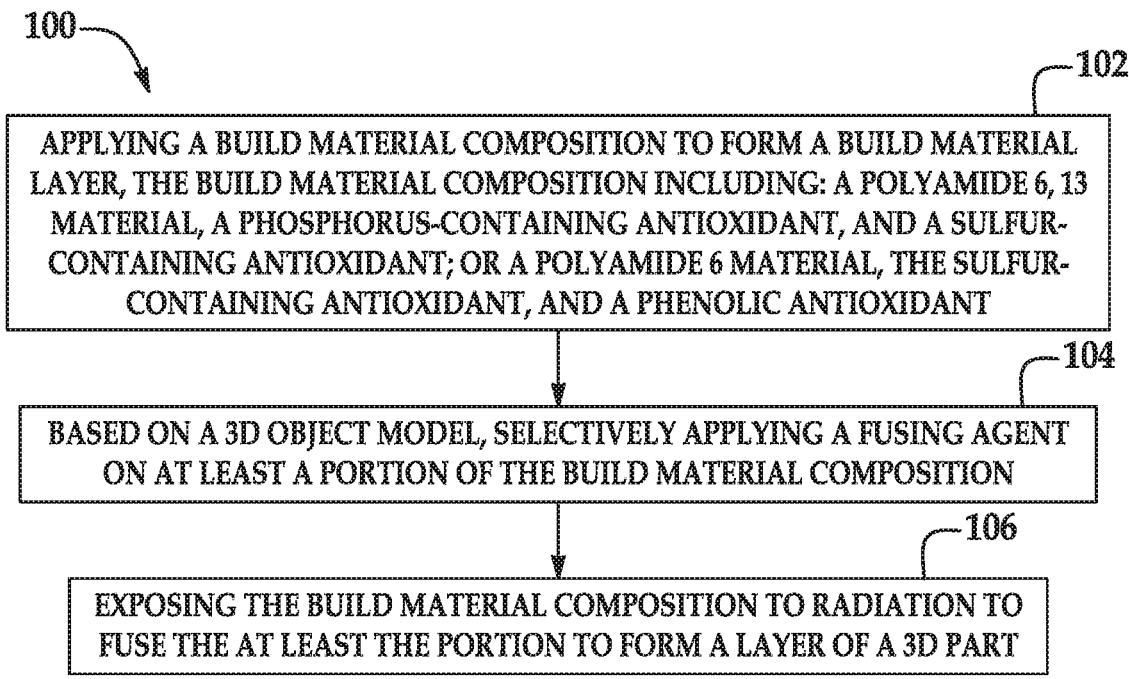
FIG. 1 is a flow diagram illustrating an example of a method for 3D printing.

Some examples of three-dimensional (3D) printing may utilize a fusing agent (including a radiation absorber) to pattern polymeric build material. In these examples, an entire layer of the polymeric build material is exposed to radiation, but the patterned region (which, in some instances, is less than the entire layer) of the polymeric build material is fused/coalesced and hardened to become a layer of a 3D part. In the patterned region, the fusing agent is capable of at least partially penetrating into voids between the polymeric build material particles, and is also capable of spreading onto the exterior surface of the polymeric build material particles. This fusing agent is capable of absorbing radiation and converting the absorbed radiation to thermal energy, which in turn fuses/coalesces the polymeric build material that is in contact with the fusing agent. Fusing/coalescing causes the polymeric build material to join or blend to form a single entity (i.e., the layer of the 3D part). Fusing/coalescing may involve at least partial thermal merging, melting, binding, and/or some other mechanism that coalesces the polymeric build material to form the layer of the 3D part.

In these examples of 3D printing, the entire layer of the polymeric build material may be pre-heated (e.g., to a temperature ranging from about 5° C. to about 50° C. below the melting point of the polymeric build material). Pre-heating the polymeric build material reduces the amount of thermal energy that is sufficient to elevate the polymeric build material above its melting point (as compared to the amount of thermal energy that is sufficient to elevate the polymeric build material that is not pre-heated above its melting point). In other words, pre-heating reduces the amount of radiation (absorbed and converted to thermal energy by the fusing agent) that is sufficient to fuse/coalesce the polymeric build material. As such, pre-heating the polymeric build material may reduce the energy and time involved in the 3D printing process, which may reduce the cost of the process.

Non-patterned and non-fused polymeric build material in layers that have been exposed to the full printing cycle (i.e., patterning and fusing) may be maintained at the pre-heating temperature throughout the 3D printing process due in part, to the pre-heating of subsequently applied build material layers, the exposure to radiation, and/or the transfer of thermal energy from the fused build material. In some instances, the non-patterned (and therefore, non-fused) build material may be maintained at the pre-heating temperature for several hours, and thus this build material may be exposed to high temperatures for a prolonged period. Moreover, the high temperature exposure may take place in an air environment (i.e., an environment containing 20 vol % or more oxygen) or another oxygen-containing environment.

Prolonged exposure to high temperatures in an oxygen-containing environment may result in the thermal degradation of the polymeric build material. For example, exposure to high temperatures in an oxygen-containing environment may result in chain scission at the amide functionality of a polyamide build material. Thermal degradation may cause discoloration of the polymeric build material and/or may reduce the reusability/recyclability of the polymeric build material.

The discoloration of the polymeric build material may be measured in terms of the change in the L* (i.e., lightness) value and/or in terms of the change in the b* (i.e., blue-yellow) value of the polymeric build material before being exposed to heating and after being exposed to heating. The change in the L* value and the change in b* value each corresponds to the amount of discoloration. For example, a larger change in the L* value or in the b* value denotes a larger amount of discoloration (i.e., a more pronounced change in color), and an unchanged L* value or b* value denotes no discoloration. As another example, an increase in the b* value denotes yellowing of the polymeric build material. While the discoloration of the polymeric build material may be due, in large part, to thermal degradation, some antioxidants (when included in the polymeric build material) may contribute to the discoloration. For example, some phenolic antioxidants may turn yellow after reacting with radicals. L* and b* are measured in the CIELAB color space, and may be measured using any suitable color measurement instrument (such as those available from Hunter-Lab).

The reusability/recyclability of the used polymeric build material (i.e., build material exposed to an aging process or one or more 3D print cycles) may be measured in terms of the decrease in relative solution viscosity as compared to the initial relative solution viscosity (i.e., of the fresh build material). A large decrease in the relative solution viscosity (e.g., a decrease of 25% or more) may denote i) poor reusability of the build material (i.e., the mechanical properties of a part built from this reused build material may be deleteriously affected), or ii) that more fresh build material may have to be mixed in with the used polymeric build material in order to compensate for its poor reusability. Further, a substantially unchanged or slightly decreased relative solution viscosity (e.g., a decrease of 10% or less) may denote good reusability. It is believed that an increase in the relative solution viscosity may not affect the reusability/recyclability of the polymeric build material.

Relative solution viscosity (or "solution viscosity" or "relative viscosity" for brevity) is determined by combining 0.5 wt % of the polymeric build material with 99.5 wt % of m-cresol (also known as 3-methylphenol) and measuring the viscosity of the mixture at room temperature (e.g., 20° C.) compared to the viscosity of pure m-cresol. The viscosity measurements are based on the time it takes for a certain volume of the mixture or liquid to pass through a capillary viscometer under its own weight or gravity. The solution viscosity is defined as a ratio of the time it takes the mixture (including the polymeric build material) to pass through the capillary viscometer to the time it takes the pure liquid takes to pass through the capillary viscometer. As the mixture is more viscous than the pure liquid and a higher viscosity increases the time it takes to pass through the capillary viscometer, the solution viscosity is greater than 1. As an example, the mixture of 0.5 wt % of the polymeric build material in 99.5 wt % of the m-cresol may take about 180 seconds to pass through the capillary viscometer, and m-cresol may take about 120 seconds to pass through the capillary viscometer. In this example, the solution viscosity is 1.5 (i.e., 180 seconds divided by 120 seconds). Further details for determining solution viscosity under this measurement protocol are described in International Standard ISO 307, Fifth Edition, 2007-05-15, incorporated herein by reference in its entirety.

To facilitate the measurement of the change in the L* value, the change in the b* value, and/or the measurement of the change in solution viscosity, the polymeric build material may be subjected to an aging process for a predetermined amount of time at a specific temperature profile. For example, the aging process may include exposing the polymeric build material to an air environment that has a temperature of about 180° C. for about 14 hours. As other examples, an environment containing 4% oxygen, or another environment may be used. The environment used during the aging process may be similar to or slightly harsher than the environment to which the polymeric build material may be exposed during 3D printing. As still other examples, a temperature of 185° C., or a temperature of 190° C., or another temperature may be used, as long as the temperature used is below the melting temperature of the polymeric build material used). The temperature used during the aging process may be similar to the temperature(s) to which the non-patterned polymeric build material may be exposed during 3D printing. As yet other examples, a time period of 5 hours, or a time period of 10 hours, or a time period 20 hours, or a time period of 45 hours, or another time period may be used. The time period of the aging process may be similar to the time period of the 3D printing process (or multiple 3D printing processes in which reused/recycled polymeric build material may be used), or may be extended to compensate for a printing process temperature that is higher than the aging temperature. The conditions associated with the aging process may, without melting the polymeric build material, facilitate the change in the L* value, the change in the b* value, and/or the change in relative solution viscosity that the polymeric build material may have exhibited as a result of being exposed to the 3D printing process that utilizes the fusing agent. It is to be understood that the change that the polymeric build material would have exhibited during 3D printing may be less than the change facilitated by the aging process depending, in part, on the environment, the temperature, and the time period of the 3D printing process.

The change in the L* value may be determined by measuring the L* value of the polymeric build material before and after the aging process, and subtracting the "before" L* value from the "after" L* value. The L* value of the polymeric build material may be greater before the aging process than after the aging process due, in part, to the darkening of the light color of the polymeric build material.

The change in the b* value may be determined by measuring the b* value of the polymeric build material before and after the aging process, and subtracting the "before" b* value from the "after" b* value. The b* value of the polymeric build material may be greater after the aging process than before the aging process due, in part, to the yellowing of the polymeric build material.

The change in solution viscosity may be determined by measuring the solution viscosity of the polymeric build material before and after the aging process, and subtracting the "before" solution viscosity from the "after" solution viscosity. In some examples, the solution viscosity of the polymeric build material is greater after the aging process than before the aging process due, in part, to polymerization through reactive end groups of the polymeric build material. In other examples, the solution viscosity of the polymeric build material is greater before the aging process than after the aging process due, in part, to thermal degradation (through oxidation) of the polymeric build material.

Build Material Compositions

Disclosed herein is a build material composition that includes a polyamide 6,13 material or a polyamide 6 material and an antioxidant package. The antioxidant package reduces the thermal degradation (and therefore, improves the stability) of the polyamide 6,13 material or the polyamide 6 material when they are exposed to high temperatures (as compared to the thermal degradation of, respectively, polyamide 6,13 material and polyamide 6 material, when exposed to high temperatures without the antioxidant package). As such, the antioxidant package may reduce the discoloration of the polyamide 6,13 material or the polyamide 6 material and/or improve the reusability/recyclability of the polyamide 6,13 material or the polyamide 6 material.

Additionally, it has been unexpectedly discovered that the antioxidant package may contribute to improved mechanical properties of the formed 3D parts. For example, the 3D parts may have improved elongation at break and/or improved ultimate tensile strength (as compared to 3D parts formed without the use of the antioxidant package).

In some examples, the build material composition includes the polyamide 6,13 material. In some of these examples, the build material composition for three-dimensional (3D) printing comprises: a polyamide 6,13 material; a phosphorus-containing antioxidant; and a sulfur-containing antioxidant. In others of these examples, the build material composition consists of the polyamide 6,13 material; the phosphorus-containing antioxidant; and the sulfur-containing antioxidant.

In other examples, the build material composition includes the polyamide 6 material. In some of these examples, the build material composition comprises: a polyamide 6 material; a sulfur-containing antioxidant; and a phenolic antioxidant. In others of these examples, the build material composition consists of the polyamide 6 material; the sulfur-containing antioxidant; and the phenolic antioxidant.

As mentioned above, in some of the examples disclosed herein, the build material composition includes the polyamide 6,13 material. In some of these examples, the polyamide 6,13 material may be in the form of a powder. In others of these examples, the polyamide 6,13 material may be in the form of a powder-like material, which includes, for example, short fibers having a length that is greater than its width. In some examples, the powder or powder-like material may be formed of, or may include, short fibers that may, for example, have been cut into short lengths from long strands or threads of material.

The polyamide 6,13 material may have a wide processing window of greater than 5° C. (i.e., the temperature range between the melting point and the re-crystallization temperature). As an example, the polyamide 6,13 material may have a melting point ranging from about 195° C. to about 215° C. As another example, the polyamide 6,13 material may have a melting point of about 210° C. As still another example, the polyamide 6,13 material may have a melting point of about 213° C.

The polyamide 6,13 material may be made up of similarly sized particles or differently sized particles. In an example, the average particle size of the polyamide 6,13 material ranges from about 2 µm to about 200 µm. In another example, the average particle size of the polyamide 6,13 material ranges from about 15 µm to about 110 µm. In still another example, the average particle size of the polyamide 6,13 material is about 55 µm. The term "particle size", as used herein, refers to the diameter of a spherical particle, or the average diameter of a non-spherical particle (i.e., the average of multiple diameters across the particle), or the volume-weighted mean diameter of a particle distribution.

An example of the polyamide 6,13 material is commercially available as 3D 8754 HT-01 from Evonik, Ind.

Examples of the polyamide 6,13 material may be used in selective laser sintering (SLS) or selective laser melting (SLM). In selective laser sintering or melting, a laser beam is aimed at a selected region (e.g., less than the entire layer) of a layer of build material, and heat from the laser beam causes the build material under the laser beam to fuse. Build material used in selective laser sintering or melting may be exposed to high temperatures for less time than build material that is used in a 3D printing process with a fusing agent (e.g., one to twenty hours less). Selective laser sintering or melting may also be accomplished in a minimum oxygen environment. Polyamide 6,13 material that is intended for use in selective laser sintering or melting may be formulated to withstand brief exposure to high temperatures in a minimum oxygen environment and not to withstand prolonged exposure to high temperatures in an air environment. The antioxidant package disclosed herein is formulated to improve the ability of polyamide 6,13 material to withstand prolonged exposure to high temperatures in an air environment (to which the polyamide 6,13 material may be exposed as part of the method for 3D printing disclosed herein).

When the build material composition includes the polyamide 6,13 material, the antioxidant package includes the phosphorus-containing antioxidant and the sulfur-containing antioxidant. The antioxidant package (including the phosphorus-containing antioxidant and the sulfur-containing antioxidant) may be in the form of fine particles (e.g., having an average particle size of 5 µm or less) that are dry blended with the polyamide 6,13 material.

The combination of the phosphorus-containing antioxidant and the sulfur-containing antioxidant improves the stability (by reducing the thermal degradation) of the polyamide 6,13 material. The combination of the phosphorus-containing antioxidant and the sulfur-containing antioxidant may reduce the thermal degradation the polyamide 6,13 material by regenerating the polyamide 6,13 material and/or consuming oxygen (which may otherwise have been used in a chain scission reaction).

In some examples, the combination of the phosphorus-containing antioxidant and the sulfur-containing antioxidant synergistically improves the stability of the polyamide 6,13 material. In other words, the combination of the phosphorus-containing antioxidant and the sulfur-containing antioxidant improves the stability of the polyamide 6,13 material more than the sum of the improvement the phosphorus-containing antioxidant can cause alone and the improvement the sulfur-containing antioxidant can cause alone. The sulfur-containing antioxidant may regenerate the phosphorus-containing antioxidant, which may then regenerate the polyamide 6,13 material and/or consume oxygen. If the phosphorus-containing antioxidant was used without the sulfur-containing antioxidant, the phosphorus-containing antioxidant would be consumed and could not continue to regenerate the polyamide 6,13 material and/or consume oxygen. As such, the sulfur-containing antioxidant increases the ability of the phosphorus-containing antioxidant to improve the stability of the polyamide 6,13 material.

In some examples, the sulfur-containing antioxidant may also regenerate other antioxidant(s) (e.g., a phenolic antioxidant) that may be included in the build material composition. In these examples, the sulfur-containing antioxidant may increase the ability of those antioxidant(s) to improve the stability of the polyamide 6,13 material.

In some examples, the phosphorus-containing antioxidant is an inorganic phosphite. In an example, the inorganic phosphite may be tris(2,4-ditert-butylphenyl) phosphite. Tris (2,4-ditert-butylphenyl) phosphite has the chemical formula:

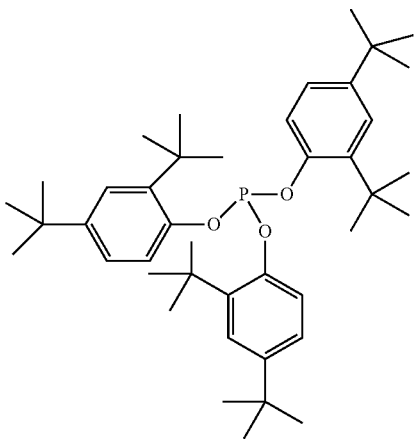

Another example of the inorganic phosphite is commercially available from Brüggemann Chemical under the tradename BRUGGOLEN® H10.

In an example, the phosphorus-containing antioxidant is present in the build material composition in an amount ranging from about 0.2 wt % to about 0.8 wt %, based on the total weight of the build material composition. If greater than 0.8 wt % of the phosphorus-containing antioxidant is present in the build material composition, the phosphorus-containing antioxidant may cause the build material composition to become discolored. If less than 0.2 wt % of the phosphorus-containing antioxidant is present in the build material composition (when the build material composition includes the polyamide 6,13 material), the phosphorus-containing antioxidant may not provide the synergistic effect with the sulfur-containing antioxidant.

In some examples, the sulfur-containing antioxidant is a thioester. In an example, the thioester may be dilauryl thiodipropionate (DLTDP). Dilauryl thiodipropionate has the chemical formula:

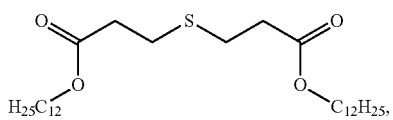

and is commercially available from Struktol Company of America under the tradename CARSTAB® DLTDP. In another example, the thioester may be dioctadecyl 3,3'-thiodipropionate (DSTDP). Dioctadecyl 3,3'-thiodipropionate has the chemical formula:

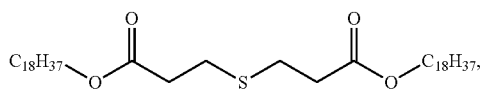

and is commercially available from Struktol Company of America under the tradename CARSTAB® DSTDP. While some thioester examples have been provided, it is believed that other thioesters may be used as the sulfur-containing antioxidant.

In an example, the sulfur-containing antioxidant is present in the build material composition (i.e., with the polyamide 6,13 material) in an amount ranging from about 0.2 wt % to about 2.4 wt %, based on a total weight of the build material composition. In another example, the sulfur-containing antioxidant is present in the build material composition (i.e., with the polyamide 6,13 material) in an amount ranging from about 0.2 wt % to about 1.5 wt %, based on a total weight of the build material composition. In some instances, if greater than 1.5 wt % of the sulfur-containing antioxidant is present in the build material composition, the sulfur-containing antioxidant may cause the build material composition to become discolored. If less than 0.2 wt % of the sulfur-containing antioxidant is present in the build material composition (when the build material composition includes the polyamide 6,13 material), the sulfur-containing antioxidant may not provide the synergistic effect with the phosphorus-containing antioxidant.

As mentioned above, in some of the examples disclosed herein, the build material composition includes the polyamide 6 material. In some of these examples, the polyamide 6 material may be in the form of a powder. In other of these examples, the polyamide 6 material may be in the form of a powder-like material, which includes, for example, short fibers having a length that is greater than its width. In some examples, the powder or powder-like material may be formed of, or may include, short fibers that may, for example, have been cut into short lengths from long strands or threads of material.

The polyamide 6 material may have a wide processing window of greater than 5° C. (i.e., the temperature range between the melting point and the re-crystallization temperature). As an example, the polyamide 6 material may have a melting point ranging from about 205° C. to about 225° C. As another example, the polyamide 6 material may have a melting point of about 210° C. As another example, the polyamide 6 material may have a melting point of about 220° C.

The polyamide 6 material may be made up of similarly sized particles or differently sized particles. In an example, the average particle size of the polyamide 6 material ranges from about 2 μm to about 200 μm. In another example, the average particle size of the polyamide 6 material ranges from about 15 µm to about 110 µm. In still another example, the average particle size of the polyamide 6 material is about 55 µm.

An example of the polyamide 6 material is commercially available from Solvay S.A. under the tradename SINTER-LINE® POWDER PA6 3400 HT 110 NATURAL (XP 1501/F).

Similar to examples of the polyamide 6,13 material, examples of the polyamide 6 material, such as SINTER-LINE® XP 1501/F, may be used in selective laser sintering or melting. As also mentioned above, build material used in selective laser sintering or melting may be exposed to high temperatures for less time than build material that is used in a 3D printing process with a fusing agent and/or selective laser sintering or melting may be accomplished in a minimum oxygen environment. As such, polyamide 6 material that is intended for use in selective laser sintering or melting may be formulated to withstand brief exposure to high temperatures in a minimum oxygen environment and not to withstand prolonged exposure to high temperatures in an air environment. The antioxidant package disclosed herein is formulated to improve the ability of polyamide 6 material to withstand prolonged exposure to high temperatures in an air environment (to which the polyamide 6 material may be exposed as part of the method for 3D printing disclosed herein).

When the build material composition includes the polyamide 6 material, the antioxidant package includes the sulfur-containing antioxidant and the phenolic antioxidant. The antioxidant package (including the sulfur-containing antioxidant and the phenolic antioxidant) may be in the form of fine particles (e.g., having an average particle size of 5 µm or less) that are dry blended with the polyamide 6 material.

The combination of the sulfur-containing antioxidant and the phenolic antioxidant improves the stability (by reducing the thermal degradation) of the polyamide 6 material. The combination of the sulfur-containing antioxidant and the phenolic antioxidant may reduce the thermal degradation the polyamide 6 material by regenerating the polyamide 6 material and/or consuming oxygen (which may otherwise have been used in a chain scission reaction).

In some examples, the combination of the sulfur-containing antioxidant and the phenolic antioxidant synergistically improves the stability of the polyamide 6 material. In other words, the combination of the sulfur-containing antioxidant and the phenolic antioxidant improves the stability of the polyamide 6 material more than the sum of the improvement the sulfur-containing antioxidant can cause alone and the improvement the phenolic antioxidant can cause alone. The sulfur-containing antioxidant may regenerate the phenolic antioxidant, which may then regenerate the polyamide 6 material and/or consume oxygen. If the phenolic antioxidant was used without the sulfur-containing antioxidant, the phenolic antioxidant would be consumed and could not continue to regenerate the polyamide 6 material and/or consume oxygen. As such, the sulfur-containing antioxidant increases the ability of the phenolic antioxidant to improve the stability of the polyamide 6 material.

In some examples, the sulfur-containing antioxidant may also regenerate other antioxidant(s) (e.g., a phosphorus-containing antioxidant) that may be included in the build material composition. In these examples, the sulfur-containing antioxidant may increase the ability of those antioxidant(s) to improve the stability of the polyamide 6 material.

The sulfur-containing antioxidant may be any of the examples (such as, dilauryl thiodipropionate or dioctadecyl 3,3'-thiodipropionate) described above or other suitable thioesters. The sulfur-containing antioxidant may be present in these examples of the build material composition (i.e., with the polyamide 6 material) in an amount ranging from about 0.2 wt % to about 2.4 wt %, based on a total weight of the build material composition. In another example, the sulfur-containing antioxidant is present in the build material composition (i.e., with the polyamide 6 material) in an amount ranging from about 0.2 wt % to about 1.5 wt %, based on a total weight of the build material composition. Again, in some instances, if greater than 1.5 wt % of the sulfur-containing antioxidant is present in the build material composition, the sulfur-containing antioxidant may cause the build material composition to become discolored. If less than 0.2 wt % of the sulfur-containing antioxidant is present in the build material composition (when the build material composition includes the polyamide 6 material), the sulfur-containing antioxidant may not provide the synergistic effect with the phenolic antioxidant.

In some examples, the phenolic antioxidant is a bis hindered phenol. In an example, the bis hindered phenol is 3,3'-Bis(3,5-di-tert-butyl-4-hydroxyphenyl)-N,N'-hexamethylenedipropionamide (i.e., N,N'-hexane-1,6-diylbis(3-(3, 5-di-tert-butyl-4-hydroxyphenyl)propionamide)). N,N'-hexane-1,6-diylbis(3-(3,5-di-tert-butyl-4-hydroxyphenyl) propionamide)) has the chemical formula:

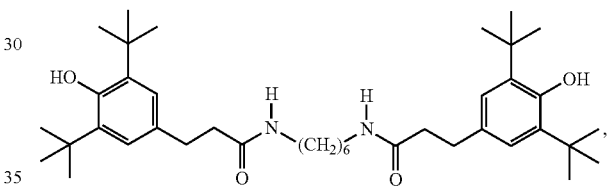

and is commercially available from BASF Corp. under the tradename IRGANOX® 1098. In another example, the bis hindered phenol is 2,2'-methylenebis(6-tert-butyl-4-methylphenol). 2,2'-Methylenebis(6-tert-butyl-4-methylphenol) has the chemical formula:

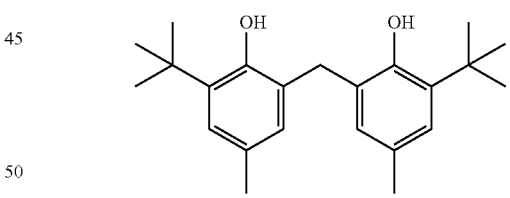

While some bis hindered phenol examples have been provided, it is believed that other bis hindered phenols may be used as the phenolic antioxidant.

In an example, the phenolic antioxidant is present in the build material composition in an amount ranging from about 0.2 wt % to about 0.8 wt %, based on the total weight of the build material composition. If greater than 0.8 wt % of the phenolic antioxidant is present in the build material composition, the phenolic antioxidant may cause the build material composition to become discolored. If less than 0.2 wt % of the phenolic antioxidant is present in the build material composition (when the build material composition includes the polyamide 6 material), the phenolic antioxidant may not provide the synergistic effect with the sulfur-containing antioxidant.

In some examples, the build material composition (including the polyamide 6,13 material or the polyamide 6 material) is devoid of any other inorganic antioxidants. In these examples, the build material composition including the polyamide 6,13 material is devoid of any inorganic antioxidants other than the phosphorus-containing antioxidant and the sulfur-containing antioxidant, and the build material composition including the polyamide 6 material is devoid of any inorganic antioxidants other than the sulfur-containing antioxidant and the phenolic antioxidant.

In another example, the build material composition (including the polyamide 6,13 material or the polyamide 6 material) is devoid of copper-based antioxidants. Copper-based antioxidants are good antioxidants for use at high temperatures (e.g., 150° C. to 250° C.) because of their stability at those temperatures. However, water (such as the water in examples of the fusing agent that may be applied on the build material composition in examples of the 3D printing method disclosed herein) may oxidize the copper, and oxidized copper may deleteriously alter the properties of the build material composition. As such, the build material compositions disclosed herein may be devoid of copper-based antioxidants.

In still another example, the build material composition (including the polyamide 6,13 material or the polyamide 6 material) is devoid of hindered amines. In yet another example, the build material composition including the polyamide 6,13 material is devoid of hindered phenols. In yet another example, the build material composition including the polyamide 6 material is devoid of phosphorus-containing antioxidants.

As used herein, the term "devoid of" when referring to a component (such as, e.g., other inorganic antioxidants, copper-based antioxidants, hindered amines, hindered phenols, phosphorus-containing antioxidants, etc.) may refer to a composition that does not include any added amount of the component, but may contain residual amounts, such as in the form of impurities. The components may be present in trace amounts, and in one aspect, in an amount of less than 0.1 weight percent (wt %) based on the total weight of the composition (e.g., the build material composition), even though the composition is described as being "devoid of" the component. In other words, "devoid of" of a component may mean that the component is not specifically included, but may be present in trace amounts or as an impurity inherently present in certain ingredients.

In still other examples, the build material composition may include other inorganic antioxidants as part of the polyamide 6,13 material or the polyamide 6 material. As examples, in addition to the respective antioxidant packages disclosed herein, the build material composition including the polyamide 6,13 material may also include a phenolic antioxidant (e.g., IRGANOX® 1098), and the build material composition including the polyamide 6 material may also include a phosphorous-containing antioxidant.

In some examples, the build material composition, in addition to the antioxidant package and the polyamide 6,13 material or the polyamide 6 material, may include, a filler, a whitener, a charging agent, a flow aid, or a combination thereof. While several examples of these additives are provided, it is to be understood that these additives are selected to be thermally stable (i.e., will not decompose) at the 3D printing temperatures.

Fillers may be added to the build material composition to modify the properties of the 3D parts to be printed. Examples of suitable fillers include alumina, silica, glass (glass beads, glass fibers, crushed glass, etc.), talc, a plasticizer (e.g., 2-methyl-benzene sulfonamide), and a combination thereof. In an example, the filler may be included in the build material composition in an amount ranging from about 1 wt % to about 60 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from about 0.01 wt % to about 10 wt %, based on the total weight of the build material composition.

Charging agent(s) may be added to the build material composition to suppress tribo-charging. Examples of suitable charging agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), polydimethylsiloxane (E900), and aluminum oxide. In an example, the flow aid is added in an amount ranging from greater than 0 wt % to less than 5 wt %, based upon the total weight of the build material composition.

Examples of the build material composition disclosed herein are reusable/recyclable. After a print cycle, some of the build material composition disclosed herein remains non-fused, and can be reclaimed and used again. This reclaimed build material is referred to as the recycled build material composition. The recycled build material composition may be exposed to 2, 4, 6, 8, 10, or more build cycles (i.e., heating to a temperature ranging from about 155° C. to about 200° C. and then cooling (e.g., passive cooling)), and reclaimed after each cycle. Between cycles, the recycled build material composition may be mixed with at least some fresh or virgin (i.e., not previously used in a 3D printing process) build material composition. In some examples, the weight ratio of the recycled build material composition to the fresh build material composition may be 80:20, 70:30, 60:40, 50:50, 40:60, 30:70, or 20:80. The weight ratio of the recycled build material composition to the fresh build material composition may depend, in part, on the stability of the build material composition, the discoloration of the recycled build material composition (as compared to the build material composition), and the desired aesthetics.

3D Printing Kits and Compositions

The build material composition described herein may be part of a 3D printing kit. In an example, the kit for three-dimensional (3D) printing, comprises: a build material composition including: a polyamide 6,13 material, a phosphorus-containing antioxidant, and a sulfur-containing antioxidant; and a fusing agent to be applied to at least a portion of the build material composition during 3D printing, the fusing agent including a radiation absorber to absorb radiation to melt or fuse the build material composition in the at least the portion. In another example, the kit for three-dimensional (3D) printing, comprises: a build material composition including: a polyamide 6 material, a sulfur-containing antioxidant, and a phenolic antioxidant; and a fusing agent to be applied to at least a portion of the build material composition during 3D printing, the fusing agent including a radiation absorber to absorb radiation to melt or fuse the build material composition in the at least the portion. In either of these examples, the kit may consist of the build material composition and the fusing agent with no other components. In still other examples, either of the kits further comprises a detailing agent. The components of the kits may be maintained separately until used together in examples of the 3D printing method disclosed herein.

Also disclosed herein is a 3D printing composition. In an example, the three-dimensional (3D) printing composition comprises: a patterned build material layer, comprising: a build material composition including: a polyamide 6,13 material, a phosphorus-containing antioxidant, and a sulfur-containing antioxidant; or a polyamide 6 material, the sulfur-containing antioxidant, and a phenolic antioxidant; interstitial spaces among the build material composition; and a fusing agent at least partially filling the interstitial spaces. In another example, the 3D printing composition further comprises a detailing agent.

In some examples of the 3D printing composition, the fusing agent fills from about 50 vol % to about 60 vol % of the interstitial spaces. In other examples of the 3D printing composition, the fusing agent fills from about 52 vol % to about 58 vol % of the interstitial spaces. In some examples, the fusing agent may also coat the build material composition.

Any example of the build material composition may be used in the examples of the 3D printing kit or in the examples of the 3D printing composition. In an example of the 3D printing kit (including polyamide 6,13 material), the phosphorus-containing antioxidant is present in the build material composition in an amount ranging from about 0.2 wt % to about 0.8 wt %, based on the total weight of the build material composition. In another example of the 3D printing kit (including polyamide 6,13 material or polyamide 6 material), the sulfur-containing antioxidant is present in the build material composition in an amount ranging from about 0.2 wt % to about 2.4 wt %, based on the total weight of the build material composition. In still another example of the 3D printing kit (including polyamide 6 material), the phenolic antioxidant is present in the build material composition in an amount ranging from about 0.2 wt % to about 0.8 wt %, based on the total weight of the build material composition.

In an example, the fusing agent includes a radiation absorber. Any of the example compositions of the fusing agent described below may be used in the examples of the 3D printing kit or in the examples of the 3D printing composition.

In another example, the detailing agent may include a surfactant, a co-solvent, and water. Any of the example compositions of the detailing agent described below may be used in the examples of the 3D printing kit or in the examples of the 3D printing composition.

Printing Methods

Referring now to FIG. 1 and FIGS. 2A through 2E, an example of a method 100, 200 for 3D printing is depicted. Prior to execution of the method 100, 200 or as part of the method 100, 200, a controller 30 (see, e.g., FIG. 3) may access data stored in a data store 32 (see, e.g., FIG. 3) pertaining to a 3D part that is to be printed. The controller 30 may determine the number of layers of the build material composition 16 that are to be formed and the locations at which the fusing agent 26 from the applicator 24 is to be deposited on each of the respective layers.

Briefly, the method 100 for three-dimensional (3D) printing comprises: applying a build material composition 16 to form a build material layer 38, the build material composition 16 including: a polyamide 6,13 material, a phosphorus-containing antioxidant, and a sulfur-containing antioxidant; or a polyamide 6 material, the sulfur-containing antioxidant, and a phenolic antioxidant (reference numeral 102); based on a 3D object model, selectively applying a fusing agent 26 on at least a portion 40 of the build material composition 16 (reference numeral 104); and exposing the build material composition 16 to radiation 44 to fuse the at least the portion 40 to form a layer 46 of a 3D part (reference numeral 106).

While not shown, the method 100, 200 may include forming the build material composition 16. In an example, the build material composition 16 is formed prior to applying the build material composition 16 to form the layer 38. The build material composition 16 may be formed by mixing the polyamide 6,13 material with the phosphorus-containing antioxidant and the sulfur-containing antioxidant, or by mixing the polyamide 6 material with the sulfur-containing antioxidant and the phenolic antioxidant.

Figure 2A:
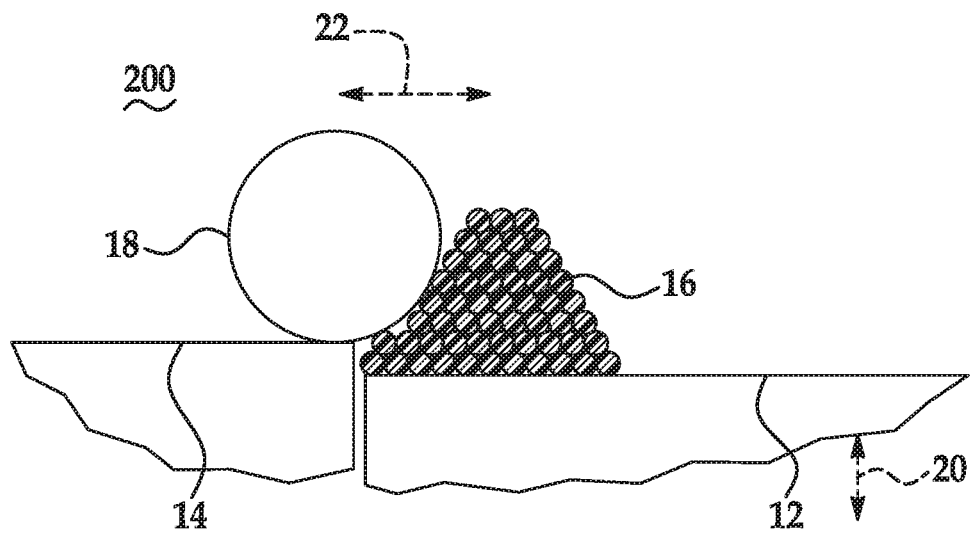
FIGS. 2A through 2E are schematic and partially cross-sectional cutaway views depicting the formation of a 3D part using an example of the 3D printing method disclosed herein.
Figure 2B:
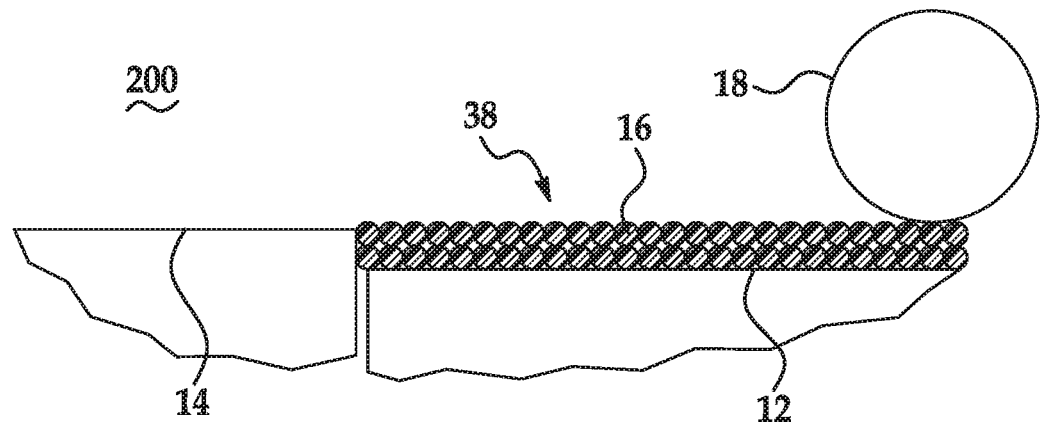

As shown at reference numeral 102 in FIG. 1 and in FIGS. 2A and 2B, the method 100, 200, includes applying the build material composition 16 to form the build material layer 38. As mentioned above, the build material composition 16 includes at least the polyamide 6,13 material, the phosphorus-containing antioxidant, and the sulfur-containing antioxidant, or at least the polyamide 6 material, the sulfur-containing antioxidant, and the phenolic antioxidant, and may additionally include other antioxidant(s), the whitener, the charging agent, the flow aid, or combinations thereof.

In the example shown in FIGS. 2A and 2B, a printing system (e.g., printing system 10 shown in FIG. 3) may be used to apply the build material composition 16. The printing system 10 may include a build area platform 12, a build material supply 14 containing the build material composition 16, and a build material distributor 18.

The build area platform 12 receives the build material composition 16 from the build material supply 14. The build area platform 12 may be moved in the directions as denoted by the arrow 20, e.g., along the z-axis, so that the build material composition 16 may be delivered to the build area platform 12 or to a previously formed layer 46 (see FIG. 2E).

In an example, when the build material composition 16 is to be delivered, the build area platform 12 may be programmed to advance (e.g., downward) enough so that the build material distributor 18 can push the build material composition 16 onto the build area platform 12 to form a substantially uniform layer 38 of the build material composition 16 thereon. The build area platform 12 may also be returned to its original position, for example, when a new part is to be built.

The build material supply 14 may be a container, bed, or other surface that is to position the build material composition between the build material distributor 18 and the build area platform 12.

The build material distributor 18 may be moved in the directions as denoted by the arrow 22, e.g., along the y-axis, over the build material supply 14 and across the build area platform 12 to spread the layer 38 of the build material composition 16 over the build area platform 12. The build material distributor 18 may also be returned to a position adjacent to the build material supply 14 following the spreading of the build material composition 16. The build material distributor 18 may be a blade (e.g., a doctor blade), a roller, a combination of a roller and a blade, and/or any other device capable of spreading the build material composition 16 over the build area platform 12. For instance, the build material distributor 18 may be a counter-rotating roller. In some examples, the build material supply 14 or a portion of the build material supply 14 may translate along with the build material distributor 18 such that build material composition 16 is delivered continuously to the material distributor 18 rather than being supplied from a single location at the side of the printing system 10 as depicted in FIG. 2A.

As shown in FIG. 2A, the build material supply 14 may supply the build material composition 16 into a position so that it is ready to be spread onto the build area platform 12. The build material distributor 18 may spread the supplied build material composition 16 onto the build area platform 12. The controller 30 may process control build material supply data, and in response control the build material supply 14 to appropriately position the particles of the build material composition 16, and may process control spreader data, and in response, control the build material distributor 18 to spread the supplied build material composition 16 over the build area platform 12 to form the layer 38 of build material composition 16 thereon. As shown in FIG. 2B, one build material layer 38 has been formed.

The layer 38 of the build material composition 16 has a substantially uniform thickness across the build area platform 12. In an example, the thickness of the build material layer 38 is about 100 µm. In another example, the thickness of the build material layer 38 ranges from about 50 µm to about 120 µm, although thinner or thicker layers may also be used. For example, the thickness of the build material layer 38 may range from about 40 µm to about 300 µm, or from about 50 µm to about 80 µm. The layer thickness may be about 2× (i.e., 2 times) the polyamide 6,13 material diameter or about 2× the polyamide 6 material diameter (as shown in FIG. 2B) at a minimum for finer part definition. In some examples, the layer thickness may be about 1.2× the polyamide 6,13 material diameter or about 1.2× the polyamide 6 material diameter.

After the build material composition 16 has been applied, and prior to further processing, the build material layer 38 may be exposed to heating. Heating may be performed to pre-heat the build material composition 16, and thus the heating temperature may be below the melting point of the polyamide 6,13 material or below the melting point of the polyamide 6 material. As such, the temperature selected will depend upon the polyamide 6,13 material or the polyamide 6 material that is used. As examples, the pre-heating temperature may be from about 5° C. to about 50° C. below the melting point of the polyamide 6,13 material or the polyamide 6 material. In an example, the pre-heating temperature ranges from about 50° C. to about 205° C. In another example, the pre-heating temperature ranges from about 180° C. to about 190° C.

Pre-heating the layer 38 of the build material composition 16 may be accomplished by using any suitable heat source that exposes all of the build material composition 16 on the build area platform 12 to the heat. Examples of the heat source include a thermal heat source (e.g., a heater (not shown) integrated into the build area platform 12 (which may include sidewalls)) or the radiation source 34, 34' (see, e.g., FIG. 3).

Figure 2C:
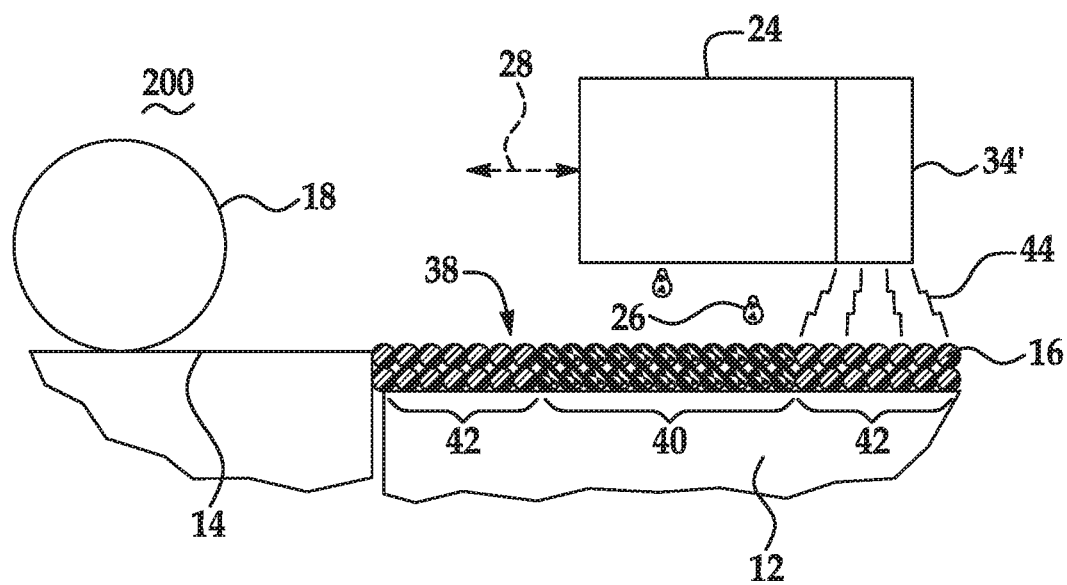

As shown at reference numeral 104 in FIG. 1 and in FIG. 2C, the method 100, 200 continues by selectively applying, based on a 3D object model, the fusing agent 26 on at least a portion 40 of the build material composition 16. Example compositions of the fusing agent 26 are described below.

It is to be understood that a single fusing agent 26 may be selectively applied on the portion 40, or multiple fusing agents 26 may be selectively applied on the portion 40. As an example, multiple fusing agents 26 may be used to create a multi-colored part. As another example, one fusing agent 26 may be applied to an interior portion of a layer and/or to interior layer(s) of a 3D part, and a second fusing agent 26 may be applied to the exterior portion(s) of the layer and/or to the exterior layer(s) of the 3D part. In the latter example, the color of the second fusing agent 26 will be exhibited at the exterior of the part.

As illustrated in FIG. 2C, the fusing agent 26 may be dispensed from the applicator 24. The applicator 24 may be a thermal inkjet printhead, a piezoelectric printhead, a continuous inkjet printhead, etc., and the selective application of the fusing agent 26 may be accomplished by thermal inkjet printing, piezo electric inkjet printing, continuous inkjet printing, etc.

The controller 30 may process data, and in response, control the applicator 24 (e.g., in the directions indicated by the arrow 28) to deposit the fusing agent 26 onto predetermined portion(s) 40 of the build material layer 38 that are to become part of the 3D part. The applicator 24 may be programmed to receive commands from the controller 30 and to deposit the fusing agent 26 according to a pattern of a cross-section for the layer of the 3D part that is to be formed. As used herein, the cross-section of the layer of the 3D part to be formed refers to the cross-section that is parallel to the surface of the build area platform 12. In the example shown in FIG. 2C, the applicator 24 selectively applies the fusing agent 26 on those portion(s) 40 of the build material layer 38 that is/are to become the first layer of the 3D part. As an example, if the 3D part that is to be formed is to be shaped like a cube or cylinder, the fusing agent 26 will be deposited in a square pattern or a circular pattern (from a top view), respectively, on at least a portion of the build material layer 38. In the example shown in FIG. 2C, the fusing agent 26 is deposited on the portion 40 of the build material layer 38 and not on the portions 42.

The volume of the fusing agent 26 that is applied per unit of the build material composition 16 in the patterned portion 40 may be sufficient to absorb and convert enough radiation 44 so that the build material composition 16 in the patterned portion 40 will fuse/coalesce. The volume of the fusing agent 26 that is applied per unit of the build material composition 16 may depend, at least in part, on the radiation absorber used, the radiation absorber loading in the fusing agent 26, and the build material composition 16 used.

The method 100, 200 may be used to form the 3D printing composition including the patterned build material layer. Once the fusing agent 26 is selectively applied, the patterned build material layer may be formed. An example of the patterned build material layer is shown in FIG. 2C. As shown in FIG. 2C, the patterned build material layer includes the build material composition 16, interstitial spaces among the build material composition 16, and the fusing agent 26 at least partially filling the interstitial spaces and coating the build material composition 16.

Figure 2D:
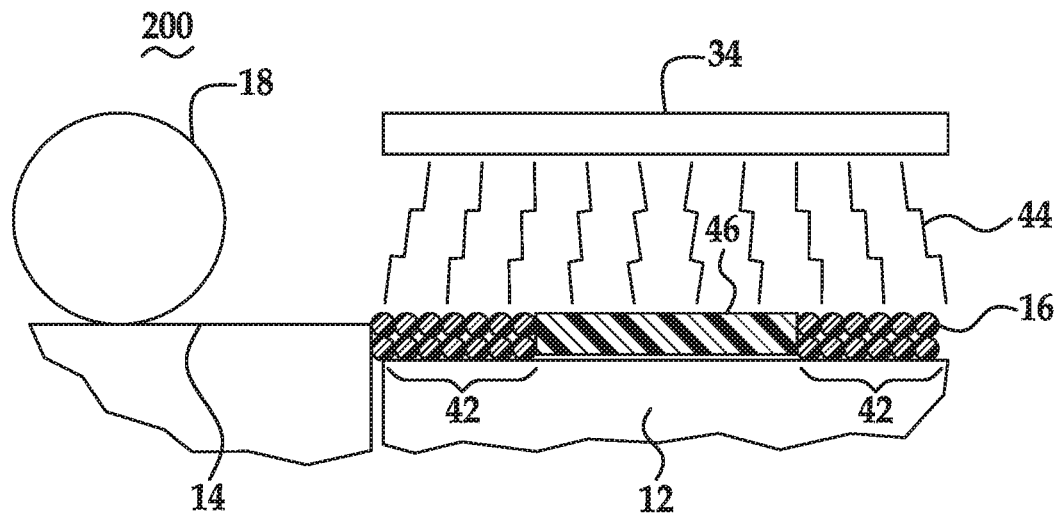

As shown at reference numeral 106 in FIG. 1 and FIGS. 2C and 2D, the method 100, 200 continues by exposing the build material composition 16 to radiation 44 to fuse/coalesce the at least the portion 40 to form a layer 46 of a 3D part. The radiation 44 may be applied with the source 34 of radiation 44 as shown in FIG. 2D or with the source 34' of radiation 44 as shown in FIG. 2C.

The fusing agent 26 enhances the absorption of the radiation 44, converts the absorbed radiation 44 to thermal energy, and promotes the transfer of the thermal heat to the build material composition 16 in contact therewith. In an example, the fusing agent 26 sufficiently elevates the temperature of the build material composition 16 in the layer 38 above the melting of the polyamide 6,13 material or the polyamide 6 material, allowing fusing/coalescing (e.g., thermal merging, melting, binding, etc.) of the build material composition 16 to take place. The application of the radiation 44 forms the fused layer 46, shown in FIG. 2D.

It is to be understood that portions 42 of the build material layer 38 that do not have the fusing agent 26 applied thereto do not absorb enough radiation 44 to fuse/coalesce. As such, these portions 42 do not become part of the 3D part that is ultimately formed.

The build material composition 16 in portions 42 may be reclaimed to be reused as build material in the printing of another 3D part. The antioxidant package may reduce the thermal degradation and improve the stability of the polyamide 6,13 material or the polyamide 6 material in the portions 42 of the build material layer 38. As such, the discoloration and the reusability/recyclability the of the polyamide 6,13 material or the polyamide 6 material in the portions 42 may be improved. In some examples, the reusability/recyclability the of the polyamide 6,13 material or the polyamide 6 material in the portions 42 may depend, in part, on the environment in which the method 100, 200 is accomplished.

In some examples, the method 100, 200 may be accomplished in an air environment. In one these examples, the build material composition 16 includes the polyamide 6,13 material, the phosphorus-containing antioxidant, and the sulfur-containing antioxidant, and the method 100, 200 is accomplished in an environment containing air. As used herein, an "air environment" or an "environment containing air" refers to an environment that contains 20 vol % or more of oxygen.

When the method 100, 200 is accomplished in an air environment, the build material composition 16 may be reused/recycled at a weight ratio of recycled build material composition to fresh build material composition ranging from 80:20 to 40:60. In one these examples, the build material composition 16 includes the polyamide 6,13 material, the phosphorus-containing antioxidant, and the sulfur-containing antioxidant, and the build material composition 16 is reused/recycled at a weight ratio of recycled build material composition to fresh build material composition of 80:20. In another of these examples, the build material composition 16 includes the polyamide 6,13 material, the phosphorus-containing antioxidant, and the sulfur-containing antioxidant, and the build material composition 16 is reused/recycled at a weight ratio of recycled build material composition to fresh build material composition of 60:40 to achieve a desired aesthetic (e.g., a lighter color of the build material composition). In still another of these examples, the build material composition 16 includes the polyamide 6 material, the sulfur-containing antioxidant, and the phenolic antioxidant, and the build material composition 16 is reused/recycled at a weight ratio of recycled build material composition to fresh build material composition of 40:60.

In other examples, the method 100, 200 may be accomplished in an environment containing less than 20 vol % of oxygen. For example, the method 100, 200 may be accomplished in an environment containing 10 vol % or less of oxygen. As another example, the method 100, 200 may be accomplished in an environment containing 4 vol % or less of oxygen. As still another example, the method 100, 200 may be accomplished in an environment containing 2 vol % or less of oxygen. As yet another example, the build material composition 16 includes the polyamide 6 material, the sulfur-containing antioxidant, and the phenolic antioxidant, and the method 100, 200 is accomplished in an environment containing 4% or less of oxygen.

When the method 100, 200 is accomplished in an environment containing 4 vol % or less of oxygen, the build material composition 16 may be reused/recycled at a weight ratio of recycled build material composition to fresh build material composition ranging from 80:20 to 40:60. In one these examples, the build material composition 16 includes polyamide 6 material, the sulfur-containing antioxidant, and the phenolic antioxidant, and the build material composition 16 is reused/recycled at a weight ratio of recycled build material composition to fresh build material composition of 80:20.

In some examples, the method 100, 200 further comprises repeating the applying of the build material composition 16, the selectively applying of the fusing agent 26, and the exposing of the build material composition 16, wherein the repeating forms the 3D part including the layer 46. In these examples, the processes shown in FIG. 1 and FIGS. 2A through 2D may be repeated to iteratively build up several fused layers and to form the 3D printed part.

Figure 2E:
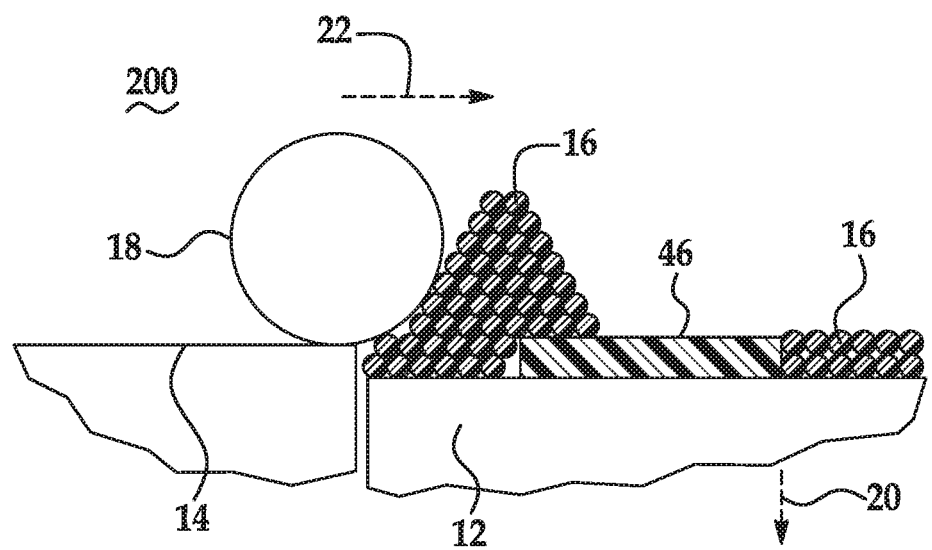

FIG. 2E illustrates the initial formation of a second build material layer on the previously formed layer 46. In FIG. 2E, following the fusing/coalescing of the predetermined portion(s) 40 of the build material composition 16, the controller 30 may process data, and in response cause the build area platform 12 to be moved a relatively small distance in the direction denoted by the arrow 20. In other words, the build area platform 12 may be lowered to enable the next build material layer to be formed. For example, the build material platform 12 may be lowered a distance that is equivalent to the height of the build material layer 38. In addition, following the lowering of the build area platform 12, the controller 30 may control the build material supply 14 to supply additional build material composition 16 (e.g., through operation of an elevator, an auger, or the like) and the build material distributor 18 to form another build material layer on top of the previously formed layer 46 with the additional build material composition 16. The newly formed build material layer may be in some instances pre-heated, patterned with the fusing agent 26, and then exposed to radiation 44 from the source 34, 34' of radiation 44 to form the additional fused layer.

Several variations of the previously described method 100, 200 will now be described.

In some examples of the method 100, 200, a detailing agent may be used. The composition of the detailing agent is described below. The detailing agent may be dispensed from another (e.g., a second) applicator (which may be similar to applicator 24) and applied to portion(s) of the build material composition 16.

The detailing agent may provide an evaporative cooling effect to the build material composition 16 to which it is applied. The cooling effect of the detailing agent reduces the temperature of the build material composition 16 containing the detailing agent during energy/radiation exposure. The detailing agent, and its rapid cooling effect, may be used to obtain different levels of melting/fusing/binding within the layer 46 of the 3D part that is being formed. Different levels of melting/fusing/binding may be desirable to control internal stress distribution, warpage, mechanical strength performance, and/or elongation performance of the final 3D part.

In an example of using the detailing agent to obtain different levels of melting/fusing/binding within the layer 46, the fusing agent 26 may be selectively applied according to the pattern of the cross-section for the layer 46 of the 3D part, and the detailing agent may be selectively applied on at least some of that cross-section. As such, some examples of the method 100, 200 further comprise selectively applying, based on the 3D object model, the detailing agent on the at least some of the at least the portion 40 of the build material composition 16. The evaporative cooling provided by the detailing agent may remove energy from the at least some of the portion 40; however, since the fusing agent 26 is present with the detailing agent, fusing is not completely prevented. The level of fusing may be altered due to the evaporative cooling, which may alter the internal stress distribution, warpage, mechanical strength performance, and/or elongation performance of the 3D part. It is to be understood that when the detailing agent is applied within the same portion 40 as the fusing agent 26, the detailing agent may be applied in any desirable pattern. The detailing agent may be applied before, after, or at least substantially simultaneously (e.g., one immediately after the other in a single printing pass, or at the same time) with the fusing agent 26, and then the build material composition 16 is exposed to radiation.

In some examples, the detailing agent may also or alternatively be applied after the layer 46 is fused to control thermal gradients within the layer 46 and/or the final 3D part. In these examples, the thermal gradients may be controlled with the evaporative cooling provided by the detailing agent.

In another example that utilizes the evaporative cooling effect of the detailing agent, the method 100, 200 further comprises selectively applying the detailing agent on another portion 42 of the build material composition 16 to aid in preventing the build material composition 16 in the other portion 42 from fusing. In these examples, the detailing agent is selectively applied, based on the 3D object model, on the other portion(s) 42 of the build material composition 16. The evaporative cooling provided by the detailing agent may remove energy from the other portion 42, which may lower the temperature of the build material composition 16 in the other portion 42 and prevent the build material composition 16 in the other portion 42 from fusing/coalescing.

In some examples, the method 100, 200 further comprises: upon completion of the 3D part, placing the 3D part in an environment having a temperature ranging from about 15° C. to about 30° C.; and maintaining the 3D part in the environment until a temperature of the 3D part reaches the temperature of the environment. In these examples, the 3D part is allowed to cool in a room temperature environment (e.g., a temperature ranging from about 15° C. to about 30° C.) upon completion of the 3D part (e.g., within about 5 minutes of forming the 3D part). As such, these examples of the method 100, 200 may be faster than examples that include heating the 3D part after its formation (i.e., exposing the 3D part to an aging process).

In other examples, the method 100, 200 further comprises heating the 3D part at a temperature ranging from about 165° C. to about 190° C. for a time period ranging from greater than 0 hours to about 60 hours. In an example, the 3D part is heated at a temperature of about 185° C. In another example, the 3D part is heated for about 24 hours. Heating may be accomplished by any suitable means. For example, the 3D part may be heated in an oven. Heating the 3D part after its formation may increase the ultimate tensile strength and/or the Young's modulus of the 3D part (as compared to the ultimate tensile strength and/or the Young's modulus of a 3D part that was allowed to cool in a room temperature environment upon completion of the 3D part). Further, the antioxidant package disclosed herein may prevent a decrease in the elongation at break of the 3D part. In other words, the elongation at break of the 3D part after heating may be similar to the elongation at break of a 3D part that was allowed to cool in a room temperature environment upon completion of the 3D part. In these examples, it is believed that that the antioxidant package may prevent the degradation of the 3D part during heating.

In some examples, the 3D part formed by the method 100, 200 may have improved elongation at break (as compared to the elongation at break of 3D parts formed with comparative build material that does not include the antioxidant package disclosed herein). In other examples, the 3D part formed may have a similar elongation at break as a 3D part formed with comparative build material that does not include the antioxidant package disclosed herein. In one example, the build material composition 16 includes the polyamide 6,13 material, the phosphorus-containing antioxidant, and the sulfur-containing antioxidant, and the 3D part has an elongation at break greater than or equal to 25%. In another example, the build material composition 16 includes the polyamide 6,13 material, the phosphorus-containing antioxidant, and the sulfur-containing antioxidant, and the 3D part has an elongation at break greater than or equal to 50%. In still another example, the build material composition 16 includes the polyamide 6,13 material, the phosphorus-containing antioxidant, and the sulfur-containing antioxidant, and the 3D part has an elongation at break of about 60%. In yet another example, the build material composition 16 includes the polyamide 6 material, the sulfur-containing antioxidant, and the phenolic antioxidant, and the 3D part has an elongation at break greater than or equal to 5%.

As used herein, "elongation at break" (also known as strain at break) refers to the additional gauge length of the 3D part, when it breaks, as a percentage of the original gauge length. For example, a 3D part with an original gauge length of 10 cm and an elongation at break of 20%, would have a gauge length of 12 cm at its break.

In some examples, the 3D part formed by the method 100, 200 may have improved ultimate tensile strength (as compared to the ultimate tensile strength of 3D parts formed with comparative build material that does not include the antioxidant package disclosed herein). In other examples, the 3D part formed may have a similar ultimate tensile strength as comparative 3D parts formed with comparative build material that does not include the antioxidant package disclosed herein. In one example, the build material composition 16 includes the polyamide 6,13 material, the phosphorus-containing antioxidant, and the sulfur-containing antioxidant, and the 3D part has an ultimate tensile strength greater than or equal to 50 MPa. In another example, the build material composition 16 includes the polyamide 6 material, the sulfur-containing antioxidant, and the phenolic antioxidant, and the 3D part has an ultimate tensile strength greater than or equal to 65 MPa.

Printing System

Figure 3:
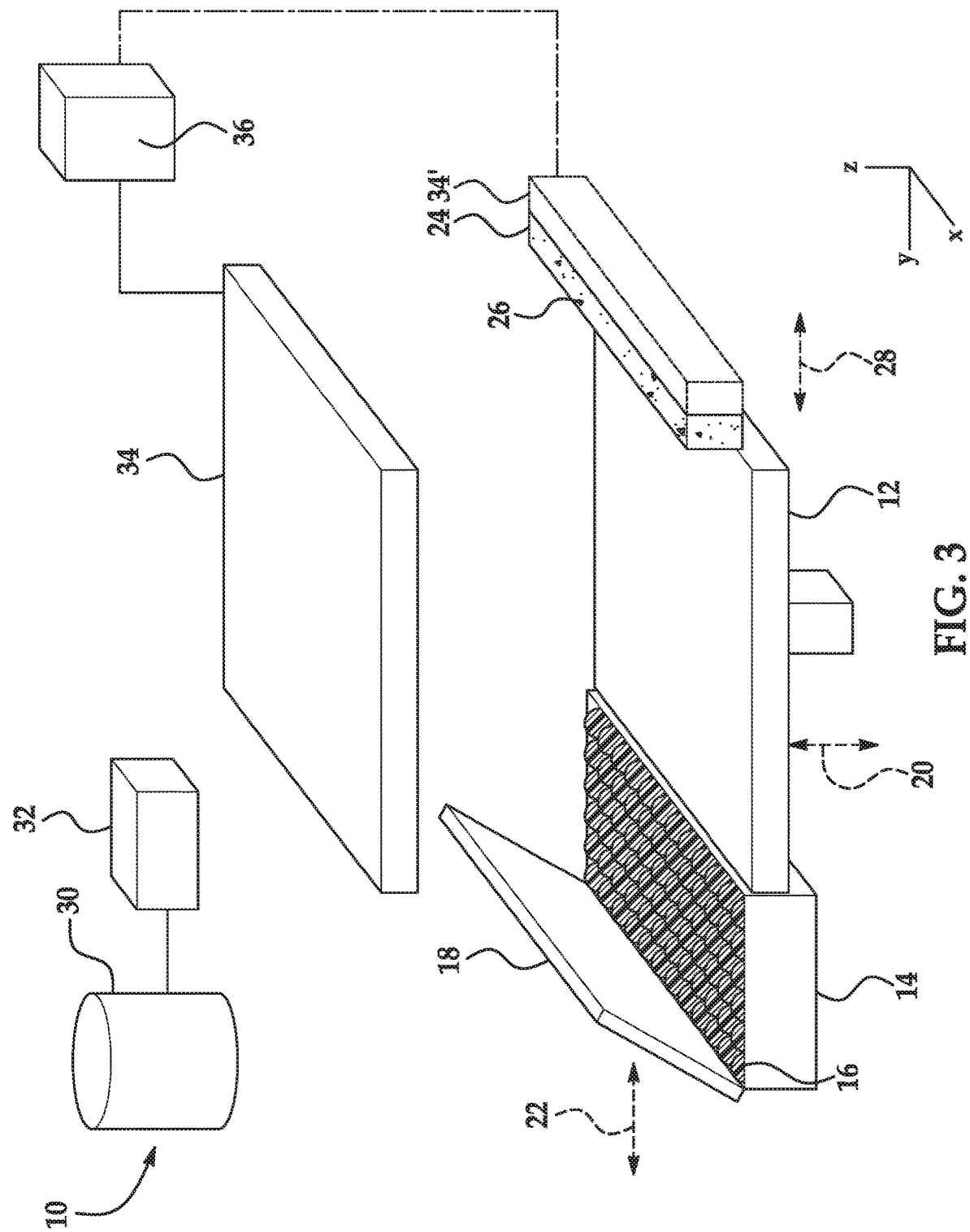
FIG. 3 is a simplified isometric and schematic view of an example of a 3D printing system disclosed herein.

Referring now to FIG. 3, an example of a 3D printing system 10 is schematically depicted. It is to be understood that the 3D printing system 10 may include additional components (some of which are described herein) and that some of the components described herein may be removed and/or modified. Furthermore, components of the 3D printing system 10 depicted in FIG. 3 may not be drawn to scale and thus, the 3D printing system 10 may have a different size and/or configuration other than as shown therein.

In an example, the three-dimensional (3D) printing system 10, comprises: a supply 14 of a build material composition 16 including: a polyamide 6,13 material, a phosphorus-containing antioxidant, and a sulfur-containing antioxidant; or a polyamide 6 material, the sulfur-containing antioxidant, and a phenolic antioxidant; a build material distributor 18; a supply of a fusing agent 26; an applicator 24 for selectively dispensing the fusing agent 26; a source 34, 34' of radiation 44; a controller 30; and a non-transitory computer readable medium having stored thereon computer executable instructions to cause the controller 30 to: utilize the build material distributor 18 to dispense the build material composition 16; utilize the applicator 24 to selectively dispense the fusing agent 26 on at least a portion 40 of the build material composition 16; and utilize the source 34, 34' of radiation 44 to expose the build material composition 16 to radiation 44 to fuse/coalesce the at least the portion 40 of the build material composition 16. Any example of the build material composition 16 may be used in the examples of the system 10.

In some examples, the 3D printing system 10 may further include a supply of a detailing agent; and a second applicator for selectively dispensing the detailing agent (neither of which are shown). In these examples, the computer executable instructions may further cause the controller 30 to utilize the second applicator to selectively dispense the detailing agent.

As shown in FIG. 3, the printing system 10 includes the build area platform 12, the build material supply 14 containing the build material composition 16, and the build material distributor 18.

As mentioned above, the build area platform 12 receives the build material composition 16 from the build material supply 14. The build area platform 12 may be integrated with the printing system 10 or may be a component that is separately insertable into the printing system 10. For example, the build area platform 12 may be a module that is available separately from the printing system 10. The build material platform 12 that is shown is one example, and could be replaced with another support member, such as a platen, a fabrication/print bed, a glass plate, or another build surface.

As also mentioned above, the build material supply 14 may be a container, bed, or other surface that is to position the build material composition 16 between the build material distributor 18 and the build area platform 12. In some examples, the build material supply 14 may include a surface upon which the build material composition 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the build material composition 16 from a storage location to a position to be spread onto the build area platform 12 or onto a previously formed layer 46 of the 3D part.

As also mentioned above, the build material distributor 18 may be a blade (e.g., a doctor blade), a roller, a combination of a roller and a blade, and/or any other device capable of spreading the build material composition 16 over the build area platform 12 (e.g., a counter-rotating roller).

As shown in FIG. 3, the printing system 10 also includes the applicator 24, which may contain the fusing agent 26. The applicator 24 may be scanned across the build area platform 12 in the directions indicated by the arrow 28, e.g., along the y-axis. The applicator 24 may be, for instance, a thermal inkjet printhead, a piezoelectric printhead, a continuous inkjet printhead, etc., and may extend a width of the build area platform 12. While the applicator 24 is shown in FIG. 3 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the fusing agent 26 over a large area of the build material composition 16. The applicator 24 may thus be attached to a moving XY stage or a translational carriage (neither of which is shown) that moves the applicator 24 adjacent to the build area platform 12 in order to deposit the fusing agent 26 in predetermined areas 40 of the build material layer 38 that has been formed on the build area platform 12 in accordance with the method 100, 200 disclosed herein. The applicator 24 may include a plurality of nozzles (not shown) through which the fusing agent 26 is to be ejected.

The applicator 24 may deliver drops of the fusing agent 26 at a resolution ranging from about 300 dots per inch (DPI) to about 1200 DPI. In other examples, the applicator 24 may deliver drops of the fusing agent 26 at a higher or lower resolution. The drop velocity may range from about 10 m/s to about 24 m/s and the firing frequency may range from about 1 kHz to about 48 kHz. In one example, the volume of each drop may be on the order of about 3 picoliters (pL) to about 18 pL, although it is contemplated that a higher or lower drop volume may be used. In some examples, the applicator 24 is able to deliver variable drop volumes of the fusing agent 26. One example of a suitable printhead has 600 DPI resolution and can deliver drop volumes ranging from about 6 pL to about 14 pL.

Each of the previously described physical elements may be operatively connected to a controller 30 of the printing system 10. The controller 30 may process print data that is based on a 3D object model of the 3D object/part to be generated. In response to data processing, the controller 30 may control the operations of the build area platform 12, the build material supply 14, the build material distributor 18, and the applicator 24. As an example, the controller 30 may control actuators (not shown) to control various operations of the 3D printing system 10 components. The controller 30 may be a computing device, a semiconductor-based microprocessor, a central processing unit (CPU), an application specific integrated circuit (ASIC), and/or another hardware device. Although not shown, the controller 30 may be connected to the 3D printing system 10 components via communication lines.

The controller 30 manipulates and transforms data, which may be represented as physical (electronic) quantities within the printer's registers and memories, in order to control the physical elements to create the 3D part. As such, the controller 30 is depicted as being in communication with a data store 32. The data store 32 may include data pertaining to a 3D part to be printed by the 3D printing system 10. The data for the selective delivery of the build material composition 16, the fusing agent 26, etc. may be derived from a model of the 3D part to be formed. For instance, the data may include the locations on each build material layer 38 that the applicator 24 is to deposit the fusing agent 26. In one example, the controller 30 may use the data to control the applicator 24 to selectively apply the fusing agent 26. The data store 32 may also include machine readable instructions (stored on a non-transitory computer readable medium) that are to cause the controller 30 to control the amount of build material composition 16 that is supplied by the build material supply 14, the movement of the build area platform 12, the movement of the build material distributor 18, the movement of the applicator 24, etc.

As shown in FIG. 3, the printing system 10 may also include a source 34, 34' of radiation 44. In some examples, the source 34 of radiation 44 may be in a fixed position with respect to the build material platform 12. The source 34 in the fixed position may be a conductive heater or a radiative heater that is part of the printing system 10. These types of heaters may be placed below the build area platform 12 (e.g., conductive heating from below the platform 12) or may be placed above the build area platform 12 (e.g., radiative heating of the build material layer surface). In other examples, the source 34' of radiation 44 may be positioned to apply radiation 44 to the build material composition 16 immediately after the fusing agent 26 has been applied thereto. In the example shown in FIG. 3, the source 34' of radiation 44 is attached to the side of the applicator 24 which allows for patterning and heating/exposing to radiation 44 in a single pass.

The source 34, 34' of radiation 44 may emit radiation 44 having wavelengths ranging from about 100 nm to about 1 mm. As one example, the radiation 44 may range from about 800 nm to about 2 µm. As another example, the radiation 44 may be blackbody radiation with a maximum intensity at a wavelength of about 1100 nm. The source 34, 34' of radiation 44 may be infrared (IR) or near-infrared light sources, such as IR or near-IR curing lamps, IR or near-IR light emitting diodes (LED), or lasers with the desirable IR or near-IR electromagnetic wavelengths.

The source 34, 34' of radiation 44 may be operatively connected to a lamp/laser driver, an input/output temperature controller, and temperature sensors, which are collectively shown as radiation system components 36. The radiation system components 36 may operate together to control the source 34, 34' of radiation 44. The temperature recipe (e.g., radiation exposure rate) may be submitted to the input/output temperature controller. During heating, the temperature sensors may sense the temperature of the build material composition 16, and the temperature measurements may be transmitted to the input/output temperature controller. For example, a thermometer associated with the heated area can provide temperature feedback. The input/output temperature controller may adjust the source 34, 34' of radiation 44 power set points based on any difference between the recipe and the real-time measurements. These power set points are sent to the lamp/laser drivers, which transmit appropriate lamp/laser voltages to the source 34, 34' of radiation 44. This is one example of the radiation system components 36, and it is to be understood that other radiation source control systems may be used. For example, the controller 30 may be configured to control the source 34, 34' of radiation 44.

Fusing Agents

In the examples of the 3D composition, the method 100, 200, and the system 10 disclosed herein, and as mentioned above, a fusing agent 26 may be used. Some examples of the fusing agent 26 are dispersions including a radiation absorber (i.e., an active material). In some examples, the active material may be any infrared light absorbing colorant. In an example, the active material is a near-infrared light absorber. Any near-infrared colorants, e.g., those produced by Fabricolor, Eastman Kodak, or BASF, Yamamoto, may be used in the fusing agent 26. As one example, the fusing agent 26 may be a printing liquid formulation including carbon black as the active material. Examples of this printing liquid formulation are commercially known as CM997A, 516458, C18928, C93848, C93808, or the like, all of which are available from HP Inc.

Other suitable active materials include near-infrared absorbing dyes or plasmonic resonance absorbers.

As another example, the fusing agent 26 may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

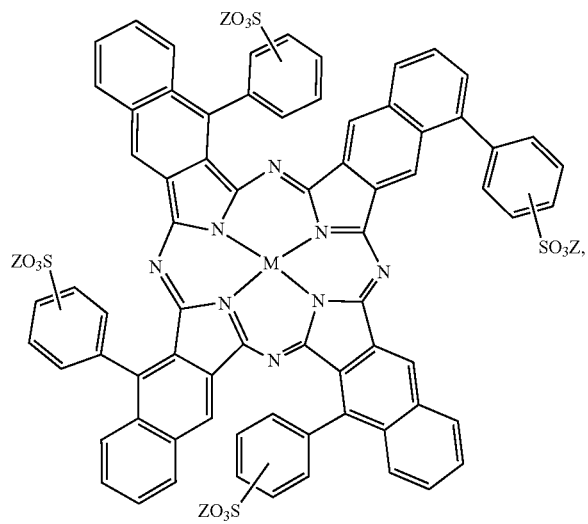
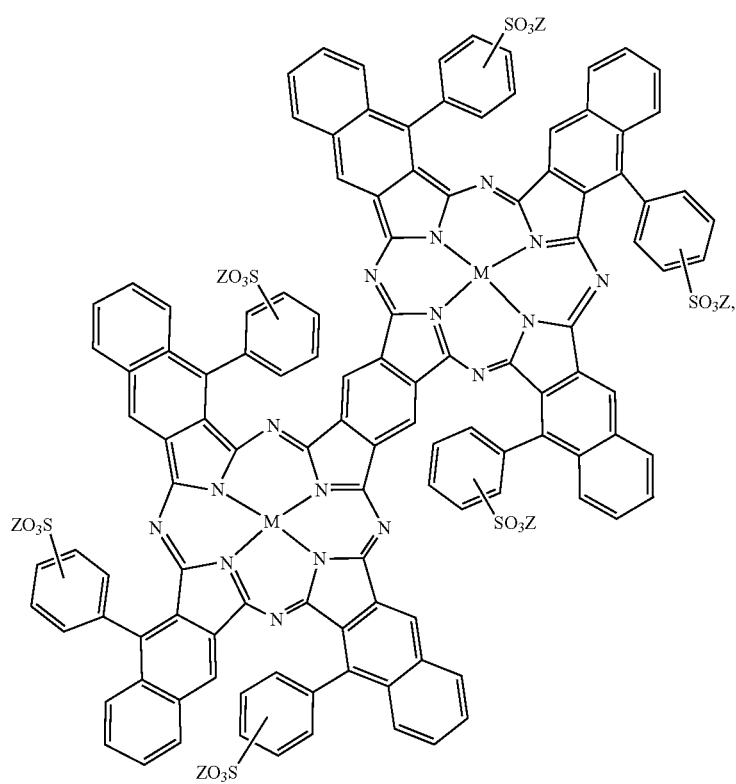

-continued

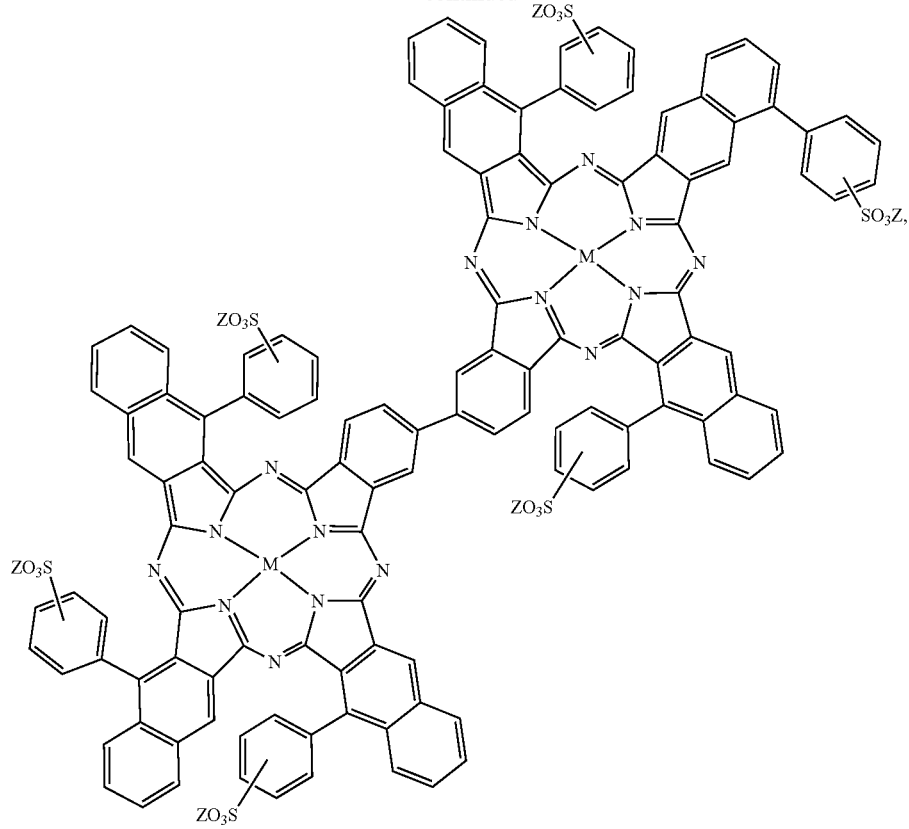

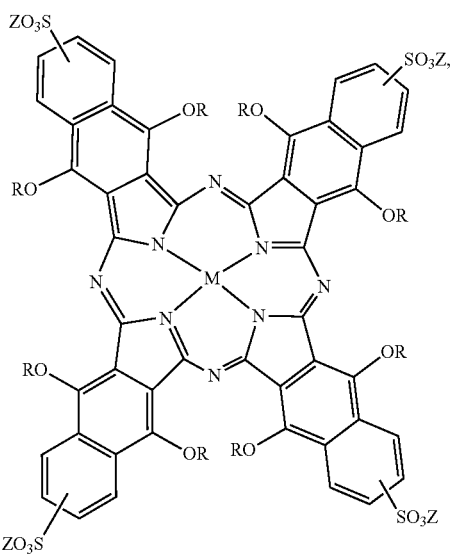

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

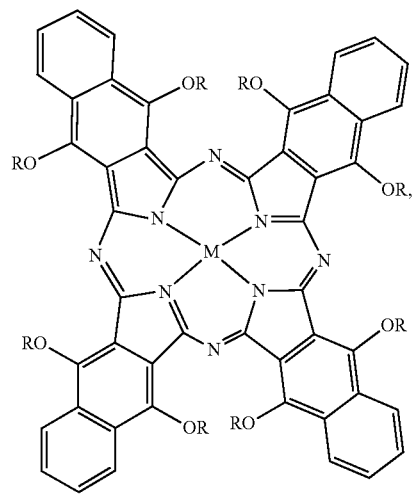
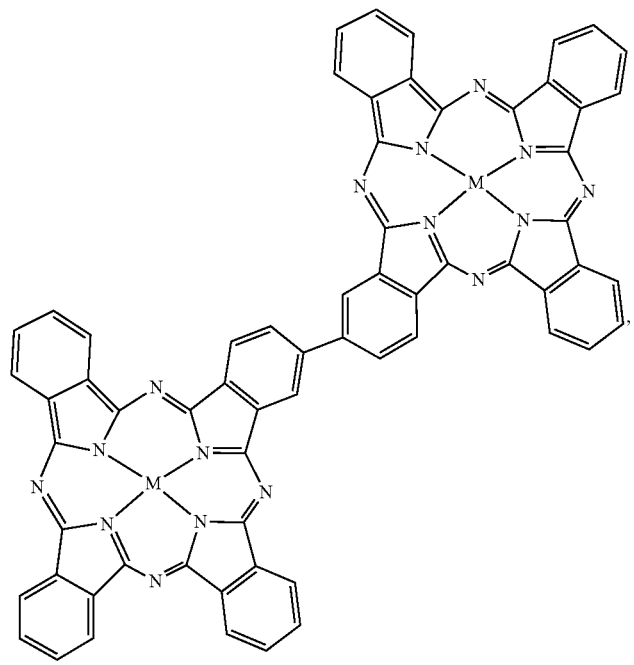

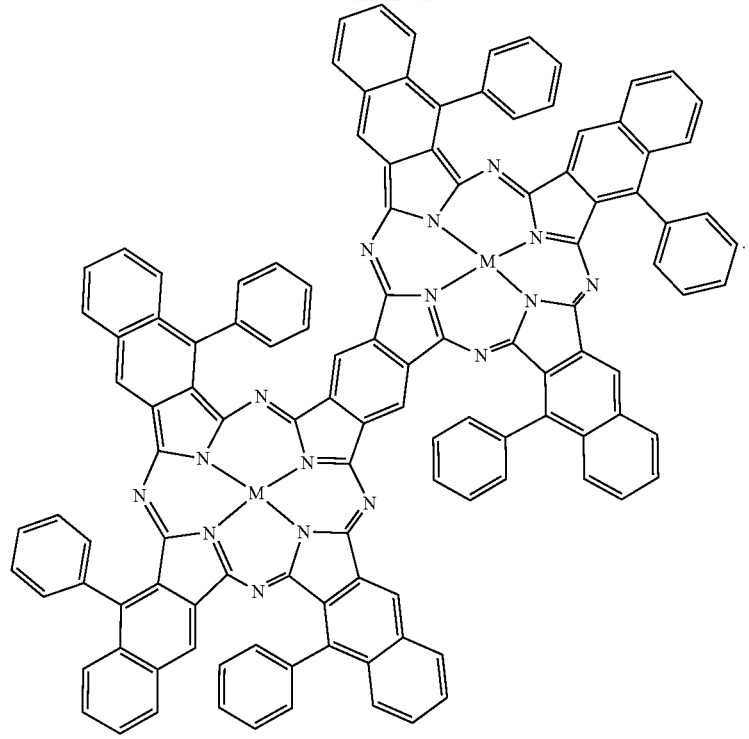

and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

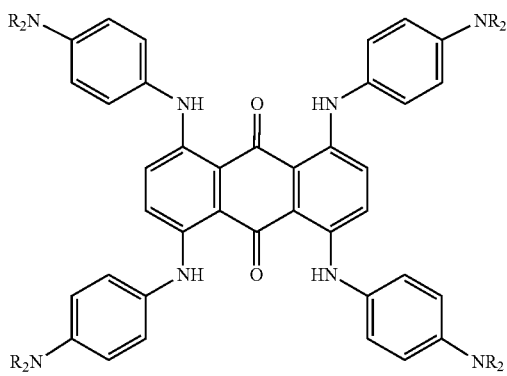

Anthroquinone dyes/pigments

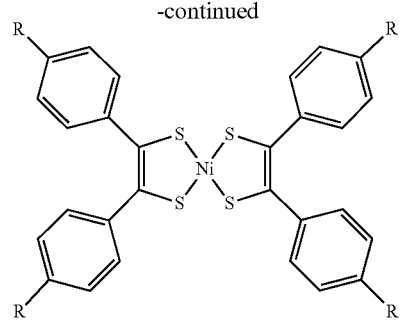

Nickel Dithiolene dyes/pigments where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

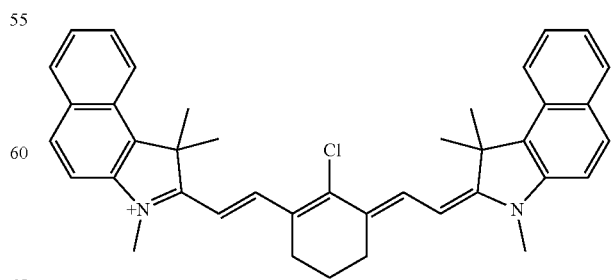

Cyanine dyes/pigments

-continued

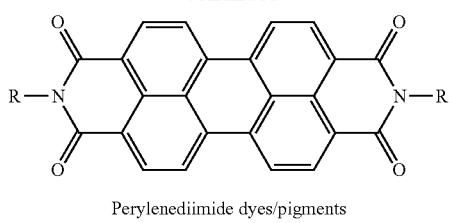

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

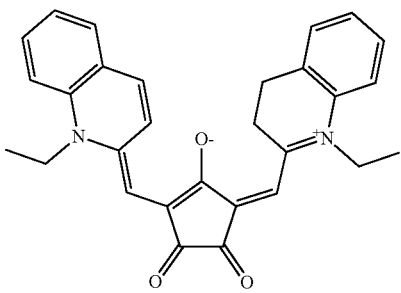

Croconium dyes/pigments

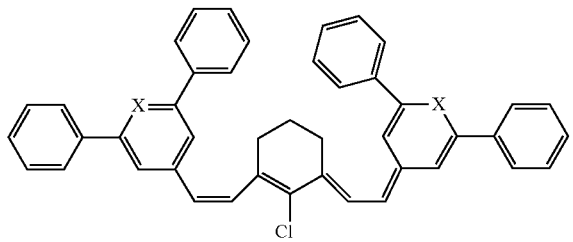

Pyrilium (X = O), thiopyrilium (X = S) dyes/pigments

Boron-dipyrromethene dyes or pigments and aza-boron-dipyrromethene dyes or pigments may have the following structures, respectively:

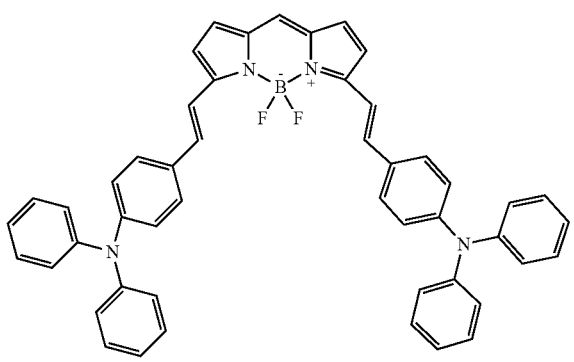

boron-dipyrromethene dyes/pigments

-continued

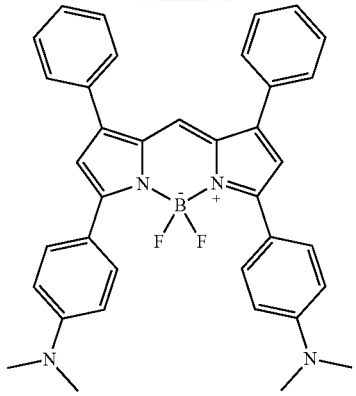

aza-boron-dipyrromethene dyes/pigments

In other examples, the active material may be a plasmonic resonance absorber, e.g., those produced by Sumitomo. The plasmonic resonance absorber allows the fusing agent 26 to absorb radiation at wavelengths ranging from 800 nm to 4000 nm (e.g., at least 80% of radiation having wavelengths ranging from 800 nm to 4000 nm is absorbed), which enables the fusing agent 26 to convert enough radiation to thermal energy so that the build material composition 16 fuses/coalesces. The plasmonic resonance absorber also allows the fusing agent 26 to have transparency at wavelengths ranging from 400 nm to 780 nm (e.g., 20% or less of radiation having wavelengths ranging from 400 nm to 780 nm is absorbed), which enables the 3D part to be white or slightly colored.

The absorption of the plasmonic resonance absorber is the result of the plasmonic resonance effects. Electrons associated with the atoms of the plasmonic resonance absorber may be collectively excited by radiation, which results in collective oscillation of the electrons. The wavelengths that can excite and oscillate these electrons collectively are dependent on the number of electrons present in the plasmonic resonance absorber particles, which in turn is dependent on the size of the plasmonic resonance absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the fusing agent 26 to be inkjet jettable as well as electromagnetically selective (e.g., having absorption at wavelengths ranging from 800 nm to 4000 nm and transparency at wavelengths ranging from 400 nm to 780 nm).

In an example, the plasmonic resonance absorber has an average particle diameter (e.g., volume-weighted mean diameter) ranging from greater than 0 nm to less than 220 nm. In another example the plasmonic resonance absorber has an average particle diameter ranging from greater than 0 nm to 120 nm. In a still another example, the plasmonic resonance absorber has an average particle diameter ranging from about 10 nm to about 200 nm.

In an example, the plasmonic resonance absorber is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the active material that is present in the fusing agent 26 ranges from greater than 0 wt % to about 40 wt % based on the total weight of the fusing agent 26. In other examples, the amount of the active material in the fusing agent 26 ranges from about 0.3 wt % to 30 wt %, from about 1 wt % to about 20 wt %, from about 1.0 wt % up to about 10.0 wt %, or from greater than 4.0 wt % up to about 15.0 wt %. It is believed that these active material loadings provide a balance between the fusing agent 26 having jetting reliability and heat and/or radiation absorbance efficiency.

As used herein, "FA vehicle" may refer to the liquid in which the active material is dispersed or dissolved to form the fusing agent 26. A wide variety of FA vehicles, including aqueous and non-aqueous vehicles, may be used in the fusing agent 26. In some examples, the FA vehicle may include water alone or a non-aqueous solvent alone with no other components. In other examples, the FA vehicle may include other components, depending, in part, upon the applicator 24 that is to be used to dispense the fusing agent 26. Examples of other suitable fusing agent components include dispersant(s), silane coupling agent(s), co-solvent(s), surfactant(s), antimicrobial agent(s), anti-kogation agent(s), and/or chelating agent(s).

When the active material is the plasmonic resonance absorber, the plasmonic resonance absorber may, in some instances, be dispersed with a dispersant. As such, the dispersant helps to uniformly distribute the plasmonic resonance absorber throughout the fusing agent 26. Examples of suitable dispersants include polymer or small molecule dispersants, charged groups attached to the plasmonic resonance absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the fusing agent 26 may range from about 10 wt % to about 200 wt % based on the weight of the plasmonic resonance absorber in the fusing agent 26.

When the active material is the plasmonic resonance absorber, a silane coupling agent may also be added to the fusing agent 26 to help bond the organic and inorganic materials. Examples of suitable silane coupling agents include the SILQUEST® A series manufactured by Momentive.

Whether a single silane coupling agent is used or a combination of silane coupling agents is used, the total amount of silane coupling agent(s) in the fusing agent 26 may range from about 0.1 wt % to about 50 wt % based on the weight of the plasmonic resonance absorber in the fusing agent 26. In an example, the total amount of silane coupling agent(s) in the fusing agent 26 ranges from about 1 wt % to about 30 wt % based on the weight of the plasmonic resonance absorber. In another example, the total amount of silane coupling agent(s) in the fusing agent 26 ranges from about 2.5 wt % to about 25 wt % based on the weight of the plasmonic resonance absorber.

The solvent of the fusing agent 26 may be water or a non-aqueous solvent (e.g., ethanol, acetone, N-methyl-2-pyrrolidone (e.g., 1-methyl-2-phyrrolidone, aliphatic hydrocarbons, etc.). In some examples, the fusing agent 26 consists of the active material and the solvent (without other components). In these examples, the solvent makes up the balance of the fusing agent 26.

Classes of organic co-solvents that may be used in a water-based fusing agent 26 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, both substituted and unsubstituted formamides, both substituted and unsubstituted acetamides, and the like. Other examples of organic co-solvents include dimethyl sulfoxide (DMSO), isopropyl alcohol, ethanol, pentanol, acetone, or the like.

Other examples of suitable co-solvents include water-soluble high-boiling point solvents, which have a boiling point of at least 120° C., or higher. Some examples of high-boiling point solvents include 2-pyrrolidone (i.e., 2-pyrrolidinone, boiling point of about 245° C.), N-methyl-2-pyrrolidone (e.g., 1-methyl-2-pyrrolidone, boiling point of about 203° C.), N-(2-hydroxyethyl)-2-pyrrolidone (boiling point of about 140° C.), 2-methyl-1,3-propanediol (boiling point of about 212° C.), and combinations thereof.

The co-solvent(s) may be present in the fusing agent 26 in a total amount ranging from about 1 wt % to about 50 wt % based upon the total weight of the fusing agent 26, depending upon the jetting architecture of the applicator 24. In an example, the total amount of the co-solvent(s) present in the fusing agent 26 is 25 wt % based on the total weight of the fusing agent 26.

The co-solvent(s) of the fusing agent 26 may depend, in part, upon the jetting technology that is to be used to dispense the fusing agent 26. For example, if thermal inkjet printheads are to be used, water and/or ethanol and/or other longer chain alcohols (e.g., pentanol) may be the solvent (i.e., makes up 35 wt % or more of the fusing agent 26) or co-solvents. For another example, if piezoelectric inkjet printheads are to be used, water may make up from about 25 wt % to about 30 wt % of the fusing agent 26, and the solvent (i.e., 35 wt % or more of the fusing agent 26) may be ethanol, isopropanol, acetone, etc. The co-solvent(s) of the fusing agent 26 may also depend, in part, upon the build material composition 16 that is being used with the fusing agent 26. For a hydrophobic powder (e.g., a polyamide), the FA vehicle may include a higher solvent content in order to improve the flow of the fusing agent 26 into the build material composition 16.

The FA vehicle may also include humectant(s). In an example, the total amount of the humectant(s) present in the fusing agent 26 ranges from about 3 wt % to about 10 wt %, based on the total weight of the fusing agent 26. An example of a suitable humectant is LIPONIC® EG-1 (i.e., LEG-1, glycereth-26, ethoxylated glycerol, available from Lipo Chemicals).

In some examples, the FA vehicle includes surfactant(s) to improve the jettability of the fusing agent 26. Examples of suitable surfactants include a self-emulsifiable, non-ionic wetting agent based on acetylenic diol chemistry (e.g., SURFYNOL® SEF from Air Products and Chemicals, Inc.), a non-ionic fluorosurfactant (e.g., CAPSTONE® fluorosurfactants, such as CAPSTONE® FS-35, from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (polyether siloxane) available from Evonik Ind.). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 26 may range from about 0.01 wt % to about 10 wt % based on the total weight of the fusing agent 26. In an example, the total amount of surfactant(s) in the fusing agent 26 may be about 3 wt % based on the total weight of the fusing agent 26.

An anti-kogation agent may be included in the fusing agent 26 that is to be jetted using thermal inkjet printing. Kogation refers to the deposit of dried printing liquid (e.g., fusing agent 26) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the fusing agent 26 may range from greater than 0.20 wt % to about 0.65 wt % based on the total weight of the fusing agent 26. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

The FA vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (Dow Chemical Co.), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.).

In an example, the fusing agent 26 may include a total amount of antimicrobial agents that ranges from about 0.05 wt % to about 1 wt %. In an example, the antimicrobial agent(s) is/are a biocide(s) and is/are present in the fusing agent 26 in an amount of about 0.25 wt % (based on the total weight of the fusing agent 26).

Chelating agents (or sequestering agents) may be included in the FA vehicle to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the fusing agent 26 may range from greater than 0 wt % to about 2 wt % based on the total weight of the fusing agent 26. In an example, the chelating agent(s) is/are present in the fusing agent 26 in an amount of about 0.04 wt % (based on the total weight of the fusing agent 26).

Detailing Agents

In the examples of the method 100, 200 and the system 10 disclosed herein, and as mentioned above, a detailing agent may be used. The detailing agent may include a surfactant, a co-solvent, and a balance of water. In some examples, the detailing agent consists of these components, and no other components. In some other examples, the detailing agent may further include a colorant. In still some other examples, detailing agent consists of a colorant, a surfactant, a co-solvent, and a balance of water, with no other components. In yet some other examples, the detailing agent may further include additional components, such as anti-kogation agent(s), antimicrobial agent(s), and/or chelating agent(s) (each of which is described above in reference to the fusing agent 26).

The surfactant(s) that may be used in the detailing agent include any of the surfactants listed above in reference to the fusing agent 26. The total amount of surfactant(s) in the detailing agent may range from about 0.10 wt % to about 5.00 wt % with respect to the total weight of the detailing agent.

The co-solvent(s) that may be used in the detailing agent include any of the co-solvents listed above in reference to the fusing agent 26. The total amount of co-solvent(s) in the detailing agent may range from about 1.00 wt % to about 20.00 wt % with respect to the total weight of the detailing agent.

Similar to the fusing agent 26, the co-solvent(s) of the detailing agent may depend, in part upon the jetting technology that is to be used to dispense the detailing agent. For example, if thermal inkjet printheads are to be used, water and/or ethanol and/or other longer chain alcohols (e.g., pentanol) may make up 35 wt % or more of the detailing agent. For another example, if piezoelectric inkjet printheads are to be used, water may make up from about 25 wt % to about 30 wt % of the detailing agent, and 35 wt % or more of the detailing agent may be ethanol, isopropanol, acetone, etc.

In some examples, the detailing agent does not include a colorant. In these examples, the detailing agent may be colorless. As used herein, "colorless," means that the detailing agent is achromatic and does not include a colorant.

When the detailing agent includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye is also capable of absorbing radiation with wavelengths of 650 nm or less. As such, the dye absorbs at least some wavelengths within the visible spectrum, but absorbs little or no wavelengths within the near-infrared spectrum. This is in contrast to the active material in the fusing agent 26, which absorbs wavelengths within the near-infrared spectrum. As such, the colorant in the detailing agent will not substantially absorb the fusing radiation, and thus will not initiate melting and fusing of the build material composition 16 in contact therewith when the build material layer 38 is exposed to the fusing radiation.

The dye selected as the colorant in the detailing agent may also have a high diffusivity (i.e., it may penetrate into greater than 10 μm and up to 100 μm of particles of the build material composition 16). The high diffusivity enables the dye to penetrate into particle of the build material composition 16 upon which the detailing agent is applied, and also enables the dye to spread into portions of the build material composition 16 that are adjacent to the portions of the build material composition 16 upon which the detailing agent is applied. The dye penetrates deep into the build material composition 16 particles to dye/color the composition particles. When the detailing agent is applied at or just outside the edge boundary (of the final 3D part), the build material composition 16 particles at the edge boundary may be colored. In some examples, at least some of these dyed build material composition 16 particles may be present at the edge(s) or surface(s) of the formed 3D layer or part, which prevents or reduces any patterns (due to the different colors of the fusing agent 26 and the build material composition 16) from forming at the edge(s) or surface(s).

The dye in the detailing agent may be selected so that its color matches the color of the active material in the fusing agent 26. As examples, the dye may be any azo dye having sodium or potassium counter ion(s) or any diazo (i.e., double azo) dye having sodium or potassium counter ion(s), where the color of azo or dye azo dye matches the color of the fusing agent 26.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

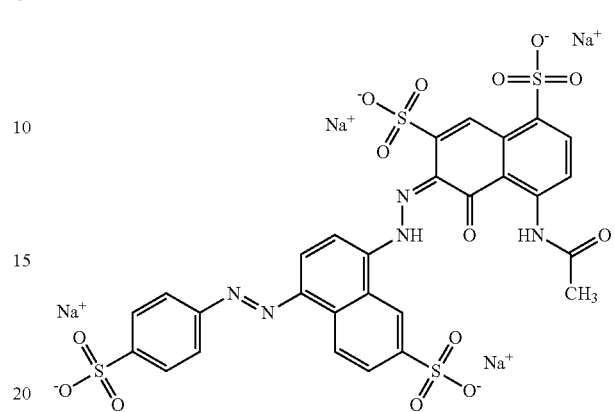

(commercially available as Food Black 1); tetrasodium 6-amino-4-hydroxy-3-[[7-sulfonato-4-[(4-sulfonatophenyl)azo]-1-naphthyl]azo]naphthalene-2,7-disulfonate with a chemical structure of:

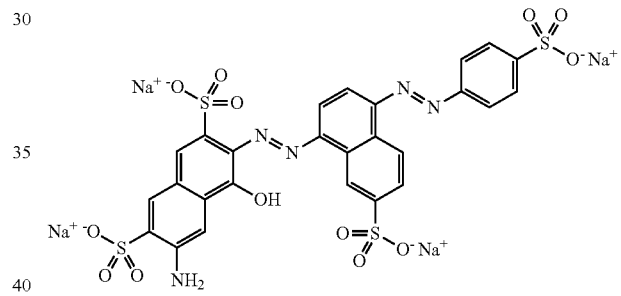

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

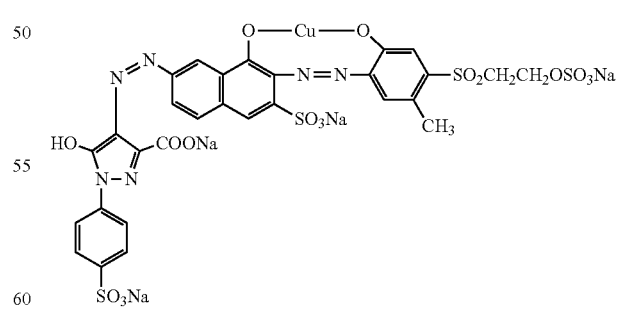

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

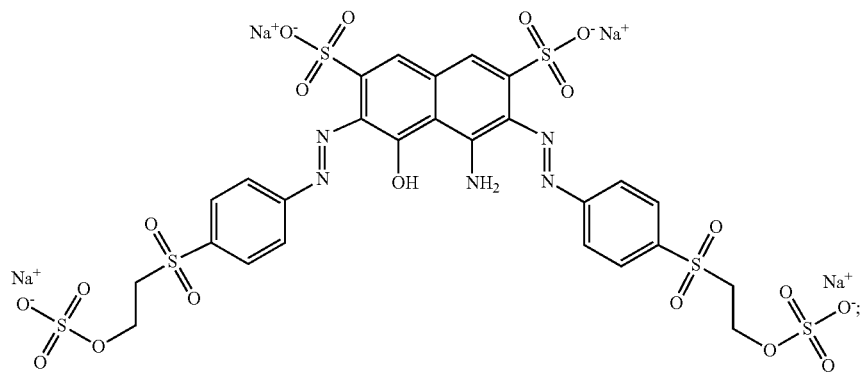

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D part.

Some examples of the other dye include a salt, such as a sodium salt, an ammonium salt, or a potassium salt. Some specific examples include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

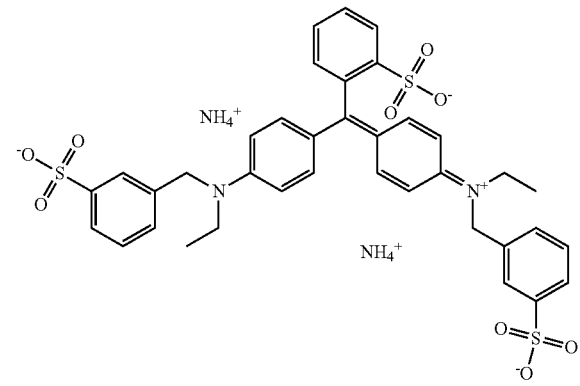

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

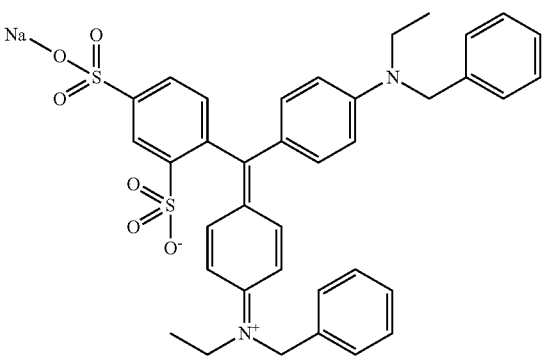

(commercially available as Acid Blue 7); and a phthalocyanine with a chemical structure of:

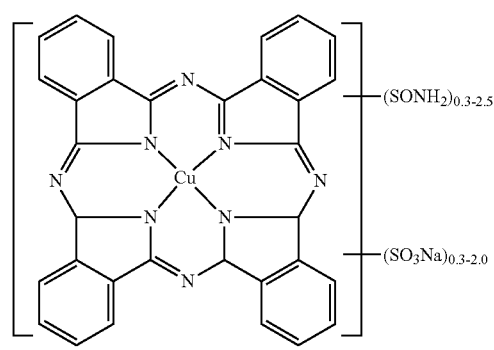

(commercially available as Direct Blue 199); and combinations thereof.

In an example of the detailing agent, the dye may be present in an amount ranging from about 1.00 wt % to about 3.00 wt % based on the total weight of the detailing agent. In another example of the detailing agent including a combination of dyes, one dye (e.g., the black dye) is present in an amount ranging from about 1.50 wt % to about 1.75 wt % based on the total weight of the detailing agent, and the other dye (e.g., the cyan dye) is present in an amount ranging from about 0.25 wt % to about 0.50 wt % based on the total weight of the detailing agent.

The balance of the detailing agent is water. As such, the amount of water may vary depending upon the amounts of the other components that are included.

To further illustrate the present disclosure, examples are given herein. It is to be understood these examples are provided for illustrative purposes and are not to be construed as limiting the scope of the present disclosure.

EXAMPLES

Example 1

An example of the build material composition disclosed herein (i.e., the first example build material composition) was prepared, and a comparative build material composition (i.e., the first comparative build material composition) was prepared. The first example build material composition included polyamide 6,13, from about 0.2 wt % to about 0.8 wt % BRUGGOLEN® H10 (from Brüggemann Chemical) as the phosphorus-containing antioxidant, and from about 0.2 wt % to about 1.5 wt % CARSTAB® DLTDP (from Struktol Company of America) as the sulfur-containing antioxidant. The first comparative build material composition included polyamide 6,13 as received, without any added antioxidants.

Figure 4A:
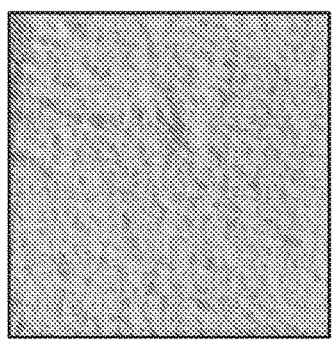
FIGS. 4A and 4B are black and white versions of originally colored photographs of a non-fused example build material composition after an aging process (4A), and a non-fused comparative build material composition after the aging process (4B)
Figure 4B:
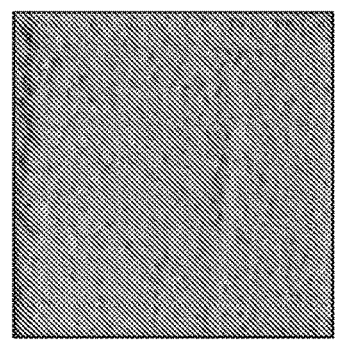

The first example build material composition and the first comparative build material composition were each used to print a 3D part on a small testbed 3D printer, and then each powder bed was aged at 185° C. for 24 hour in an air environment. Before printing, the first example build material composition and the first comparative build material composition each had a L* value of 96.48. After the aging process, the non-fused first example build material composition had a L* value of 84.4, and the non-fused first comparative build material composition had a L* value of 79.7. FIG. 4A shows the non-fused first example build material composition after the aging process, and FIG. 4B shows the non-fused first comparative build material composition after the aging process.

The first example build material composition (which included an example of the antioxidant package) was less discolored and more stable than the first comparative build material composition. The change in the L* value after printing and aging was less for the first example build material composition than for the first comparative example build material composition. These L* values indicate that the first example build material composition was less discolored and more stable than the first comparative build material composition. Further, FIGS. 4A and 4B show that the first example build material composition was lighter, and therefore, less discolored and more stable, than the first comparative build material composition.

Figure 5A:
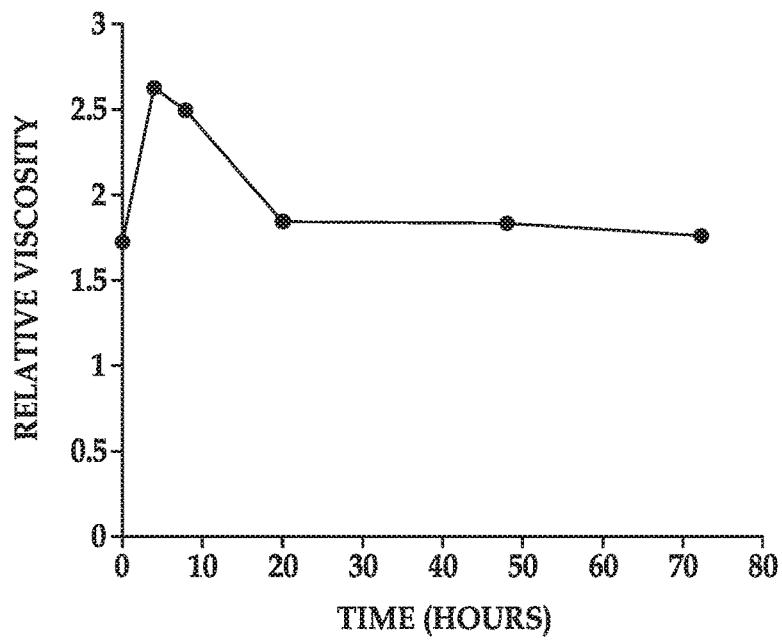
FIGS. 5A, 5B, and 5C are graphs showing relative solution viscosity (i.e., relative viscosity) as a function of aging time for, respectively, an example build material composition (in an air environment) (5A), a comparative build material composition (in an air environment) (5B), and the example build material composition (in an environment containing 4 vol % of oxygen) (5C), with the relative solution viscosity shown on the y-axes, and the aging time (in hours) shown on the x-axes.
Figure 5B:
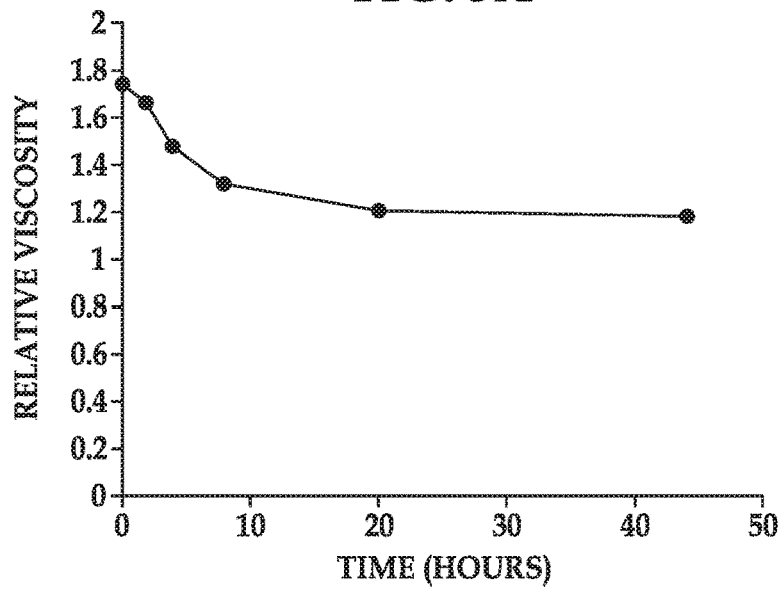

The first example build material composition and the first comparative build material composition were also each tested for reusability/recyclability. The first example build material composition and the first comparative build material composition were each aged at 190° C. in an air environment. The relative solution viscosity (at ambient temperature) of each of the first example build material composition and the first comparative build material composition was measured before the aging process and at several points during the aging process. The relative solution viscosity values for the first example build material composition are shown in FIG. 5A, and the relative solution viscosity values for the first comparative build material composition are shown in FIG. 5B. In FIGS. 5A and 5B, the relative solution viscosity is shown on the y-axes, and the time for which the build material composition was aged (in hours) is shown on the x-axes.

FIG. 5A shows that, after an initial increase, the relative solution viscosity of the first example build material composition remained substantially unchanged over time. This indicates that the first example build material composition has good reusability/recyclability when initially used in an air environment. The relative solution viscosity values in FIG. 5A indicate that first example build material composition may be reused/recycled at a weight ratio of recycled build material composition to fresh build material composition of 80:20, although a lower weight ratio (e.g., a weight ratio of recycled build material composition to fresh build material composition of 60:40 or lower) may be used to achieve a desired aesthetic.

FIG. 5B shows that the relative solution viscosity of the first comparative build material composition decreased by over 10% within 5 hours of aging, and by about 33% after 20 hours of aging. These decreases in relative solution viscosity indicate that the first comparative build material composition when initially used in an air environment is not reusable/recyclable or may have to be mixed with a large amount of fresh build material in order to compensate for a likely loss in mechanical properties.

Figure 5C:
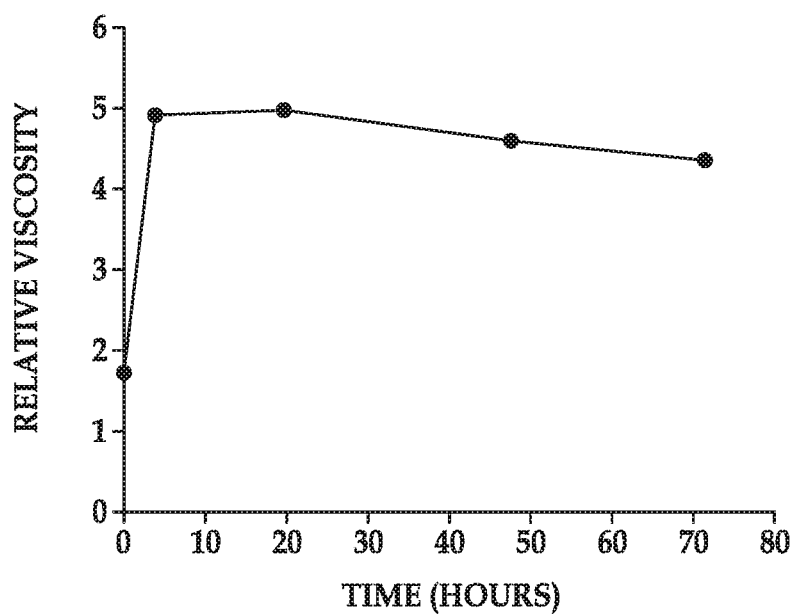

The first example build material composition was also aged at 185° C. in an environment containing 4 vol % of oxygen. The relative solution viscosity of the first example build material composition was measured before the aging process and at several points during the aging process. The relative solution viscosity values for the first example build material composition are shown in FIG. 5C. In FIG. 5C, the relative solution viscosity is shown on the y-axis, and the time for which the first example build material composition was aged (in hours) is shown on the x-axis.

FIG. 5C shows that the relative solution viscosity of the first example build material composition increased by over 150% within 5 hours of aging, and remained increased by over about 125% after 70 hours of aging. These increases in relative solution viscosity indicate that the first example build material composition polymerized faster than it thermally degraded in the environment containing 4 vol % of oxygen. As such, these results (as compared to the results shown in FIG. 5A) indicated that the first example build material composition is more suitable for a 3D printing process that utilizes a fusing agent in an air environment than in an environment containing 4 vol % of oxygen.

Example 2

Another example of the build material composition (i.e., the second example build material composition) was prepared, and another comparative build material composition (i.e., the second comparative build material composition) was prepared. The second example build material composition included SINTERLINE® XP 1501/F (from Solvay S.A.) as the example polyamide 6 material, from about 0.2 wt % to about 1.5 wt % CARSTAB® DLTDP (from Struktol Company of America) as the sulfur-containing antioxidant, and from about 0.2 wt % to about 0.8 wt % IRGANOX® 1098 (from BASF Corp.) as the phenolic antioxidant. The second comparative build material composition included SINTERLINE® XP 1501/F, without any added antioxidants.

The second example build material composition and the second comparative build material composition were each used to print a 3D part on a small testbed 3D printer, and then each powder bed was aged at 180° C. for 14 hours in an air environment. Each of the second example build material composition and the second comparative build material composition was also to print another 3D part on a small testbed 3D printer, and then was aged at 190° C. for 14 hours in an air environment.

After printing and before the aging process, the second example build material composition and the second comparative build material composition each had a L* value of about 95. After the aging process at 180° C. for 14 hours in an air environment, the non-fused second example build material composition had a L* value of about 89, and the non-fused second comparative build material composition had a L* value of about 70. After the aging process at 190° C. for 14 hours in an air environment, the non-fused second example build material composition had a L* value of about 79, and the non-fused second comparative build material composition had a L* value of about 54.

Figure 6A:
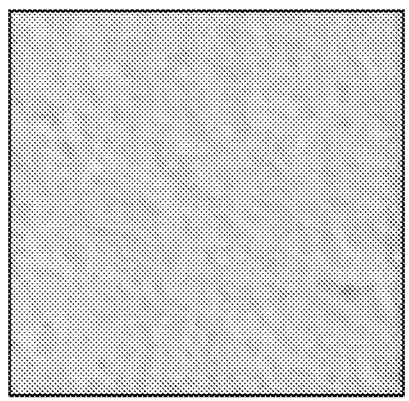
FIGS. 6A and 6B are black and white versions of originally colored photographs showing, respectively, another example build material composition and another comparative build material composition after a 3D printing process and then aging at 180° C. for 14 hours in an air environment.
Figure 6B:
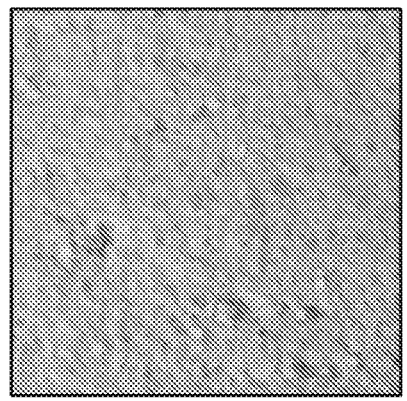
Figure 6C:
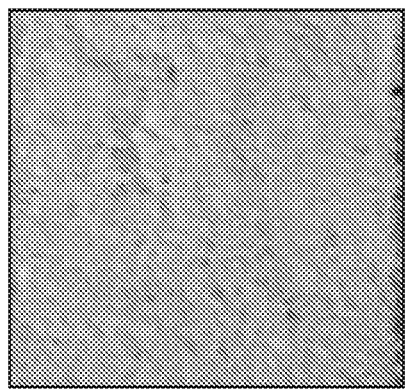
FIGS. 6C and 6D are black and white versions of originally colored photographs showing, respectively, the other example build material composition and the other comparative build material composition after a 3D printing process and then aging at 190° C. for 14 hours in an air environment.
Figure 6D:
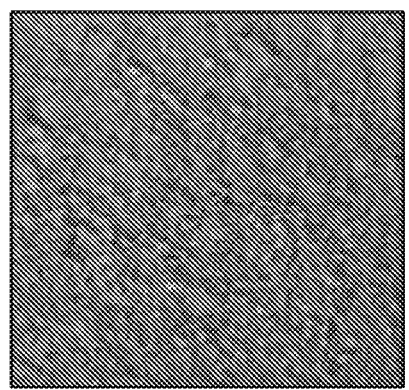

FIG. 6A shows the non-fused second example build material composition after the aging process at 180° C. for 14 hours in an air environment. FIG. 6B shows the non-fused second comparative build material composition after the aging process at 180° C. for 14 hours in an air environment. FIG. 6C shows the non-fused second example build material composition after the aging process at 190° C. for 14 hours in an air environment. FIG. 6D shows the non-fused second comparative build material composition after the aging process at 190° C. for 14 hours in an air environment.

The second example build material composition (which included an example of the antioxidant package disclosed herein) was less discolored and more stable than the second comparative build material composition. The change in the L* value after printing and aging (at both temperatures) was less for the second example build material composition than for the second comparative example build material composition. The L* values of the build material compositions indicate that the second example build material composition was less discolored and more stable than the second comparative build material composition. Further, FIGS. 6A through 6D show that the second example build material composition was lighter, and therefore, less discolored and more stable, than the second comparative build material composition.

Figure 7:
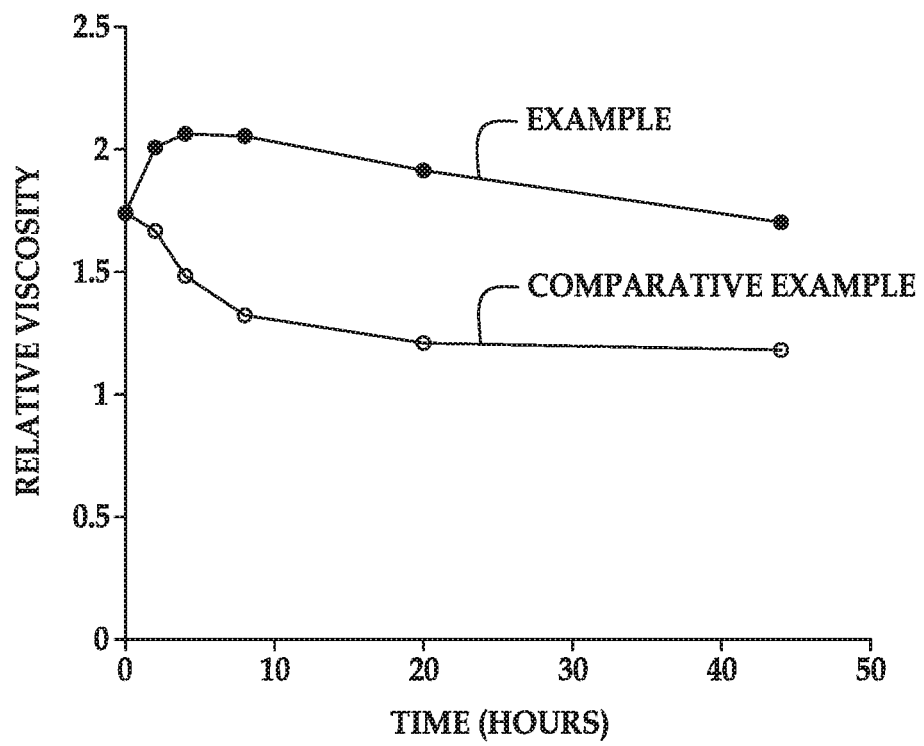
FIG. 7 is a graph showing relative solution viscosity (i.e., relative viscosity) as a function of aging time for the other example build material composition (EXAMPLE) and the other comparative build material composition (COMPARATIVE EXAMPLE), with the relative solution viscosity shown on the y-axis, and the aging time (in hours) shown on the x-axis.

Each of the second example build material composition and the second comparative build material composition was also tested for reusability/recyclability. The second example build material composition was aged at 190° C. in an environment containing 4 vol % of oxygen, and the second comparative build material composition was aged at 190° C. in an air environment. The relative solution viscosity of each of the second example build material composition and the second comparative build material composition was measured before the aging process and at several points during the aging process. The relative solution viscosity values for the second example build material composition (labeled "Example") and the relative solution viscosity values for the second comparative build material composition (labeled "Comparative Example") are shown in FIG. 7. In FIG. 7, the relative solution viscosity is shown on the y-axis, and the time for which the build material composition was aged (in hours) is shown on the x-axis.

FIG. 7 shows that, after an initial increase, the relative solution viscosity of the second example build material composition remained substantially unchanged over time. This indicates that the second example build material composition has good reusability/recyclability when used in an environment containing 4 vol % of oxygen. The relative solution viscosity values of the second example build material composition in FIG. 7 indicate that second example build material composition may be reused/recycled at a weight ratio of recycled build material to fresh build material of 80:20, although a lower weight ratio (e.g., a weight ratio of recycled build material to fresh build material of 40:60) may be used.

FIG. 7 also shows that the relative solution viscosity of the second comparative build material composition decreased by over 10% within 5 hours of aging, and by about 33% after 20 hours of aging. These decreases in relative solution viscosity indicate that the second comparative build material composition, when used in an environment containing 4 vol % of oxygen, is not reusable/recyclable or may have to be mixed with a large amount of fresh build material in order to compensate for a likely loss in mechanical properties.

Figure 8:
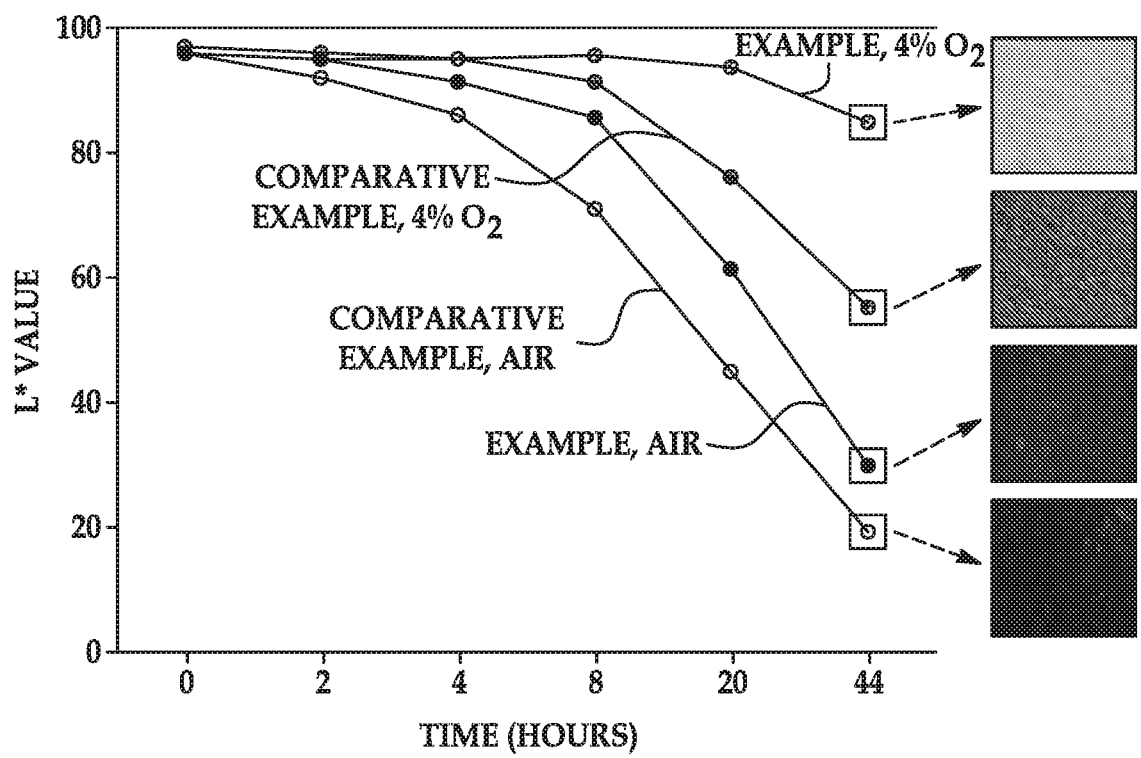
FIG. 8 depicts i) a graph showing the L* value as a function of aging time for the other example build material composition (EXAMPLE, aged in air or 4 vol % $O_2$) and the other comparative build material composition (COMPARATIVE EXAMPLE, aged in air or 4 vol % $O_2$), with the L* value shown on the y-axis, and the aging time (in hours) shown on the x-axis, and ii) black and white versions of originally colored photographs of the various compositions after aging.

Each of the second example build material composition and the second comparative build material composition was also aged at 190° C. in an environment containing 4 vol % of oxygen, and aged at 190° C. in an environment containing air. The L* value of each build material composition was measured before the aging process and at several points during the aging process. The L* values for each build material composition are shown in FIG. 8. The second example build material composition aged in the environment containing 4 vol % of oxygen is labeled "Example, 4% $O_2$"; the second example build material composition aged in the environment containing air is labeled "Example, Air"; the second comparative build material composition aged in the environment containing 4 vol % of oxygen is labeled "Comparative Example, 4% $O_2$"; and the second comparative build material composition aged in the environment containing air is labeled "Comparative Example, Air." In FIG. 8, the L* value is shown on the y-axis, and the time for which the build material composition was aged (in hours) is shown on the x-axis. FIG. 8 also shows each build material (in black and white) after 44 hours of aging.

FIG. 8 shows that the L* value for the second example build material composition aged in the environment containing 4 vol % of oxygen was changed the least by the aging process. FIG. 8 also shows that the second example build material composition aged in the environment containing 4 vol % of oxygen was the lightest in color after 44 hours of aging. These results indicate that the second example build material composition aged in the environment containing 4 vol % of oxygen was less discolored and more stable than the second example build material composition aged in the environment containing air and the second comparative build material composition aged in the environment containing 4 vol % of oxygen or aged in the environment containing air. The second example build material composition aged in the environment containing air may be reusable, for example, when combined with a higher amount of fresh build material (e.g., at ratios of fresh:recycled of 60:40, 70:30, 80:20, or 90:10, or any ratio in between the two extremes).

Example 3

3D parts were printed using each of the first example build material composition (from Example 1), the second example build material composition (from Example 2), the first comparative build material composition (from Example 1), and the second comparative build material composition (from Example 2). Each 3D part was printed on a small testbed 3D printer in an air environment with an example fusing agent that included carbon black as the active material. Each 3D part was allowed to cool in a room temperature environment upon completion of the build and was not heated after formation.

Figure 9:
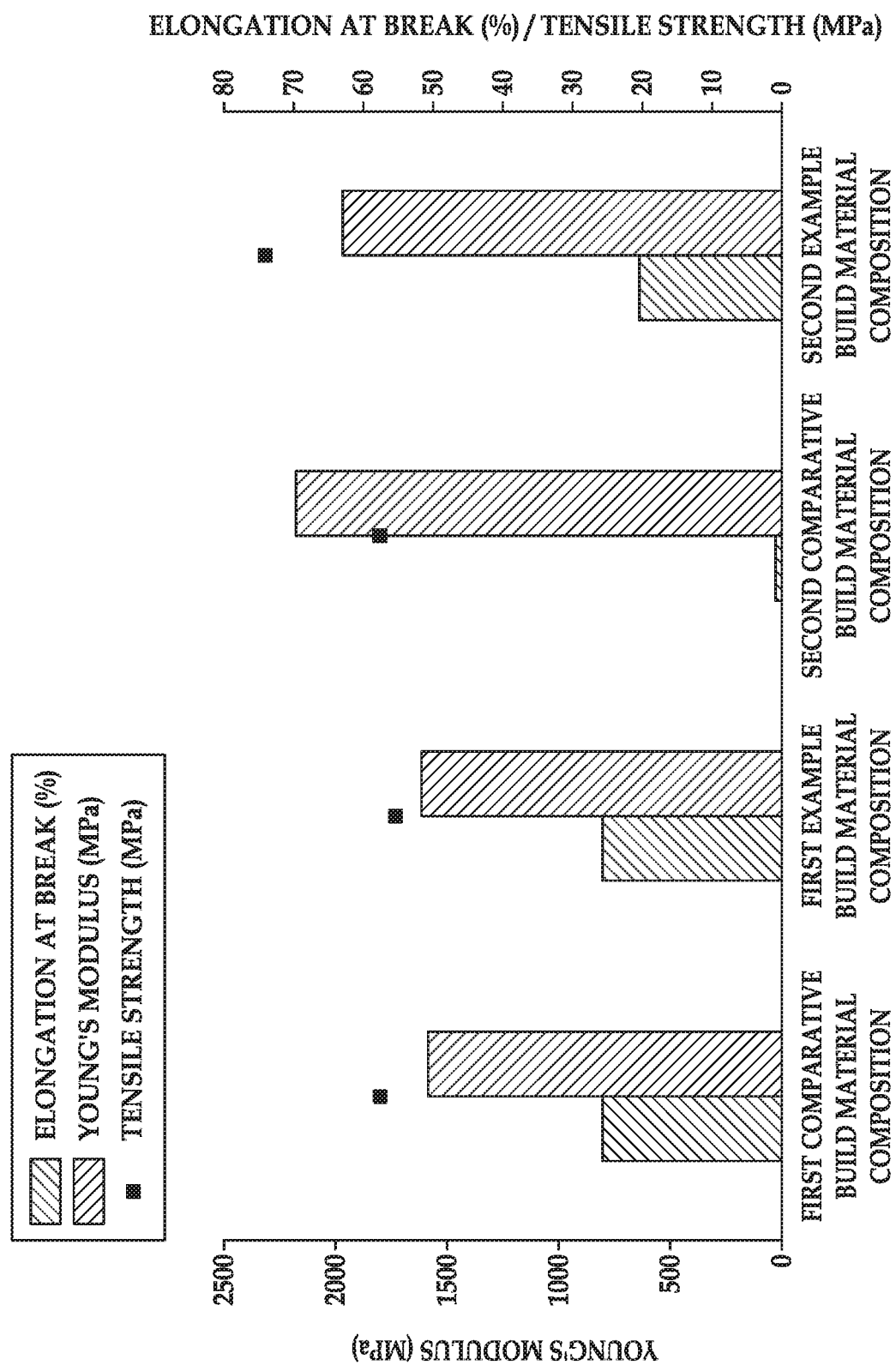
FIG. 9 is a graph showing the ultimate tensile strength, the elongation at break, and the Young's Modulus of 3D parts that were 3D printed with example and comparative example build material compositions, with the ultimate tensile strength (in MPa, right y-axis), the elongation at break (in %, right y-axis), and the Young's Modulus (in MPa, left y-axis) shown on the y-axes, and the 3D parts identified by the build material composition used to form the 3D parts on the x-axis.

The ultimate tensile strength, elongation at break, and Young's Modulus of the 3D parts were measured using Instron testing equipment. The values for each of these measurements are shown in FIG. 9. In FIG. 9, the ultimate tensile strength (in MPa, right axis), the elongation at break (in %, right axis), and the Young's Modulus (in MPa, left axis) are shown on the y-axes. Each 3D part is identified on the x-axis by the build material composition used to form the 3D part.

FIG. 9 shows that the mechanical properties (i.e., ultimate tensile strength, elongation at break, and Young's Modulus) of the 3D parts formed from the first example build material composition and the first comparative build material composition were comparable. This indicates that the mechanical properties were unaffected by including an example of the antioxidant package in the first example build material composition.

FIG. 9 also shows that the ultimate tensile strength and the elongation at break of the 3D part formed from the second example build material composition were greater than the ultimate tensile strength and the elongation at break of the 3D part formed from the second comparative build material composition. This indicates that the ultimate tensile strength and the elongation at break were improved by including an example of the antioxidant package in the second example build material composition.

Several additional 3D parts were printed using the first example build material composition and the first comparative build material composition. Each 3D part was printed on a small testbed 3D printer in an air environment with an example fusing agent that included carbon black as the active material. After being printed, each 3D part was aged at 185° C. in an environment containing air for 24 hours.

The elongation at break of each part was measured. The average elongation at break for the 3D parts printed with the first example build material composition was about 60%, and the average elongation at break for the 3D parts printed with first comparative build material composition was about 30%. These results indicate that the elongation at break for the aged 3D printed parts was improved by including the antioxidant package in the first example build material composition.

It is to be understood that the ranges provided herein include the stated range and any value or sub-range within the stated range. For example, from about 0.2 wt % to about 1.5 wt % should be interpreted to include not only the explicitly recited limits of from about 0.2 wt % to about 1.5 wt %, but also to include individual values, such as about 0.25 wt %, about 0.55 wt %, about 0.74 wt %, about 1.03 wt %, about 1.2 wt %, about 1.45 wt %, etc., and sub-ranges, such as from about 0.2 wt % to about 0.8 wt %, from about 0.85 wt % to about 1.35 wt %, from about 0.44 wt % to about 1.2 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A kit for three-dimensional (3D) printing, comprising:
   a build material composition including:
      a polyamide 6,13 material;
      a phosphorus-containing antioxidant including tris(2, 4-ditert-butylphenyl) phosphite or a phosphonate-based antioxidant; and
      a sulfur-containing antioxidant including dilauryl thiodipropionate (DLTDP) or dioctadecyl 3,3'-thiodipropionate (DSTDP); and
   a fusing agent to be applied to at least a portion of the build material composition during 3D printing, the fusing agent including a radiation absorber to absorb radiation to melt or fuse the build material composition in the at least the portion.

2. The kit as defined in claim 1 wherein the phosphorus-containing antioxidant is present in the build material composition in an amount ranging from about 0.2 wt % to about 0.8 wt %, based on a total weight of the build material composition.

3. The kit as defined in claim 1 wherein the sulfur-containing antioxidant is present in the build material composition in an amount ranging from about 0.2 wt % to about 2.4 wt %, based on a total weight of the build material composition.

4. A method for three-dimensional (3D) printing, comprising:
   applying a build material composition to form a build material layer, the build material composition including:
      a polyamide 6,13 material, a phosphorus-containing antioxidant including tris(2,4-ditert-butylphenyl) phosphite or a phosphonate-based antioxidant, and a sulfur-containing antioxidant including dilauryl thiodipropionate (DLTDP) or dioctadecyl 3,3'-thiodipropionate (DSTDP); or
      a polyamide 6 material, the sulfur-containing antioxidant, and a phenolic antioxidant;
   based on a 3D object model, selectively applying a fusing agent on at least a portion of the build material composition; and
   exposing the build material composition to radiation to fuse the at least the portion to form a layer of a 3D part.

5. The method as defined in claim 4 wherein the build material composition includes the polyamide 6,13 material, the phosphorus-containing antioxidant, and the sulfur-containing antioxidant, and the method is accomplished in an environment containing air.

6. The method as defined in claim 4 wherein the build material composition includes the polyamide 6 material, the sulfur-containing antioxidant, and the phenolic antioxidant, and the method is accomplished in an environment containing 4 vol % or less of oxygen.

7. The method as defined in claim 4 wherein one of:
   i) the build material composition includes the polyamide 6,13 material, the phosphorus-containing antioxidant, and the sulfur-containing antioxidant;
   the phosphorus-containing antioxidant is present in the build material composition in an amount ranging from about 0.2 wt % to about 0.8 wt %, based on a total weight of the build material composition; and the sulfur-containing antioxidant is present in the build material composition in an amount ranging from about 0.2 wt % to about 2.4 wt %, based on a total weight of the build material composition; or ii) the build material composition includes the polyamide 6 material, the sulfur-containing antioxidant, and the phenolic antioxidant;

the phenolic antioxidant is present in the build material composition in an amount ranging from about 0.2 wt % to about 0.8 wt %, based on a total weight of the build material composition; and the sulfur-containing antioxidant is present in the build material composition in an amount ranging from about 0.2 wt % to about 2.4 wt %, based on a total weight of the build material composition.

8. The method as defined in claim 4, further comprising repeating the applying of the build material composition, the selectively applying of the fusing agent, and the exposing of the build material composition, wherein the repeating forms the 3D part including the layer.

9. The method as defined in claim 8 wherein the build material composition includes the polyamide 6,13 material, the phosphorus-containing antioxidant, and the sulfur-containing antioxidant, and the 3D part has an ultimate tensile strength greater than or equal to 50 MPa.

10. The method as defined in claim 8 wherein the build material composition includes the polyamide 6,13 material, the phosphorus-containing antioxidant, and the sulfur-containing antioxidant, and the 3D part has an elongation at break greater than or equal to 50%.

11. The method as defined in claim 8 wherein the build material composition includes the polyamide 6 material, the sulfur-containing antioxidant, and the phenolic antioxidant, and the 3D part has an ultimate tensile strength greater than or equal to 65 MPa.

12. The method as defined in claim 8 wherein the build material composition includes the polyamide 6 material, the sulfur-containing antioxidant, and the phenolic antioxidant, and the 3D part has an elongation at break greater than or equal to 5%.

13. The kit as defined in claim 1 wherein the sulfur-containing antioxidant and the phosphorus-containing antioxidant have an average particle size of about 5 μm or less.

14. The method as defined in claim 4, wherein the sulfur-containing antioxidant and the phosphorus-containing antioxidant have an average particle size of about 5 μm or less.

15. The kit as defined in claim 1 wherein the build material composition consists of the polyamide 6,13 material, the phosphorus-containing antioxidant, and the sulfur-containing antioxidant.

16. The kit as defined in claim 15 wherein:

the phosphorus-containing antioxidant is present in an amount ranging from about 0.2 wt % to about 0.8 wt %, based on a total weight of the build material composition; and the sulfur-containing antioxidant is present in an amount ranging from about 0.2 wt % to about 1.5 wt %, based on a total weight of the build material composition.

17. The kit as defined in claim 16 wherein the phosphorus-containing antioxidant is the phosphonate-based antioxidant and the sulfur-containing antioxidant is the dioctadecyl 3,3'-thiodipropionate.

* * * * *